(12) United States Patent
Valles Rey et al.

(10) Patent No.: US 11,260,821 B2
(45) Date of Patent: Mar. 1, 2022

(54) AIRBAG MOUNTING TAB ASSEMBLY

(71) Applicant: ZF Passive Safety Systems US Inc., Washington, MI (US)

(72) Inventors: Luis Raul Valles Rey, Shelby Charter Township, MI (US); Dylan Moran, Rochester Hills, MI (US)

(73) Assignee: ZF PASSIVE SAFETY SYSTEMS US INC., Washington, MI (US)

(*) Notice: Subject to any disclaimer, the term of this patent is extended or adjusted under 35 U.S.C. 154(b) by 194 days.

(21) Appl. No.: 16/508,588

(22) Filed: Jul. 11, 2019

(65) Prior Publication Data

US 2021/0009071 A1 Jan. 14, 2021

(51) Int. Cl.
*B60R 21/213* (2011.01)
*B60R 21/232* (2011.01)
*B60R 21/215* (2011.01)

(52) U.S. Cl.
CPC .......... *B60R 21/213* (2013.01); *B60R 21/232* (2013.01); *B60R 2021/21506* (2013.01)

(58) Field of Classification Search
CPC ................ B60R 21/213; B60R 21/232; B60R 2021/21506
See application file for complete search history.

(56) References Cited

U.S. PATENT DOCUMENTS

| | | | | |
|---|---|---|---|---|
| 6,223,389 B1 * | 5/2001 | Walsh | ............... | A47H 13/00 16/87.2 |
| 8,091,918 B2 * | 1/2012 | Mitchell | ............... | B60R 21/201 280/728.2 |
| 8,505,961 B2 * | 8/2013 | Jakobsson | ............. | B60R 21/232 280/728.2 |
| 8,562,016 B2 * | 10/2013 | Higano | ............... | B60R 21/213 280/730.2 |
| 9,315,169 B2 * | 4/2016 | Vinssac | ............... | B60R 21/213 |
| 10,807,554 B2 * | 10/2020 | Floersheimer | ........ | B60R 21/214 |
| 2007/0024031 A1 * | 2/2007 | Coleman | ............... | B60R 21/217 280/728.2 |
| 2018/0290618 A1 * | 10/2018 | Floersheimer | ........ | B60R 21/214 |
| 2019/0092265 A1 * | 3/2019 | Kakimoto | ............. | B60R 21/201 |
| 2019/0126882 A1 * | 5/2019 | Hayashi | ............. | B60R 21/2342 |
| 2020/0031307 A1 * | 1/2020 | Hill | ......................... | B32B 5/024 |
| 2020/0047699 A1 * | 2/2020 | Dinsdale | ............... | B60R 21/213 |
| 2020/0079314 A1 * | 3/2020 | Zawisa | ................. | B60R 21/232 |
| 2020/0282945 A1 * | 9/2020 | McKeon | ............... | B60R 21/214 |
| 2021/0001798 A1 * | 1/2021 | Moran | ............... | B60R 21/2346 |

\* cited by examiner

*Primary Examiner* — Karen Beck
(74) *Attorney, Agent, or Firm* — Tarolli, Sundheim, Covell & Tummino LLP

(57) ABSTRACT

An apparatus for helping to protect an occupant of a vehicle includes a curtain airbag inflatable from a stored condition to a deployed condition in which the curtain airbag is positioned between a side structure of the vehicle and the vehicle occupant. The curtain airbag comprises a mounting tab comprising overlying layers of airbag material that define a pocket and through each of which a mounting tab aperture extends. A bracket comprises a plate with a bracket aperture extending therethrough. The bracket is positioned in the pocket so that the bracket aperture is aligned with the mounting tab apertures. A fastener has a portion extending though the mounting tab apertures and the bracket aperture. The fastener blocks the bracket from removal from the pocket.

24 Claims, 28 Drawing Sheets

AIRBAG MOUNTING TAB ASSEMBLY

FIELD OF THE INVENTION

The invention relates to an apparatus for helping to protect an occupant of a vehicle. More particularly, the invention relates to an airbag inflatable between a vehicle occupant and a side structure of a vehicle and means for mounting the airbag to the vehicle.

BACKGROUND OF THE INVENTION

It is known to inflate an inflatable vehicle occupant protection device to help protect a vehicle occupant in the event of a vehicle collision. One particular type of inflatable vehicle occupant protection device is an inflatable curtain that is fixed to the roof of the vehicle and/or to a support structure adjacent to the roof of the vehicle. The inflatable curtain is configured to inflate from the roof of the vehicle downward inside the passenger compartment in the event of a side impact or a vehicle rollover. The inflatable curtain, when inflated, is positioned between a vehicle occupant and the side structure of the vehicle.

Certain inflatable curtains include a plurality of mounting assemblies along a length of the inflatable curtain for mounting the inflatable curtain to the roof of the vehicle and/or to a support structure adjacent to the roof of the vehicle. The mounting assemblies support the inflatable curtain against the deployment forces of the inflatable curtain. Certain mounting assemblies, however, do not protect against abrasions/wear forming on the mounting assembly. The formation of abrasions/wear on the mounting assembly can lead to the detachment of the inflatable curtain from the roof of the vehicle and/or the support structure. Other mounting assemblies include a bracket positioned on each opposing side of the mounting assembly to reinforce the mounting assembly and limit the development of abrasions/wear.

SUMMARY OF THE INVENTION

According to one aspect, an apparatus for helping to protect an occupant of a vehicle includes a curtain airbag inflatable from a stored condition to a deployed condition in which the curtain airbag is positioned between a side structure of the vehicle and the vehicle occupant. The curtain airbag comprises a mounting tab comprising overlying layers of airbag material that define a pocket and through each of which a mounting tab aperture extends. A bracket comprises a plate with a bracket aperture extending therethrough. The bracket is positioned in the pocket so that the bracket aperture is aligned with the mounting tab apertures. A fastener has a portion extending though the mounting tab apertures and the bracket aperture. The fastener blocks the bracket from removal from the pocket.

According to another aspect, alone or in combination with any other aspect, the curtain airbag can be a one-piece woven (OPW) curtain airbag. The mounting tab can comprise an integral woven portion of the OPW curtain airbag. The mounting tab can comprise a portion of the OPW curtain airbag that is folded over to define the overlying layers, which can be stitched or otherwise connected to form the pocket.

According to another aspect, alone or in combination with any other aspect, the folded over portion can comprise a single layer portion of the OPW curtain airbag.

According to another aspect, alone or in combination with any other aspect, the curtain airbag can be a one-piece woven (OPW) curtain airbag. The mounting tab can comprise a mounting tab base and a single length of material stitched or otherwise connected to the mounting tab base to form the pocket. The mounting tab base can comprise an integral woven portion of the OPW curtain airbag.

According to another aspect, alone or in combination with any other aspect, at least two side portions of the single length of material can be stitched or otherwise connected to the mounting tab base to form the pocket. The pocket can have at least one open end portion for receiving the bracket.

According to another aspect, alone or in combination with any other aspect, the curtain airbag can be a one-piece woven (OPW) curtain airbag. The OPW curtain airbag can comprise two overlying fabric layers that are woven simultaneously and interwoven in portions to form OPW seams. The mounting tab can be an integral woven portion of the OPW curtain airbag. The overlying layers of airbag material can be interconnected by the OPW seams along at least two side portions to define the pocket.

According to another aspect, alone or in combination with any other aspect, the pocket can have at least one open end portion for receiving the bracket.

According to another aspect, alone or in combination with any other aspect, the mounting tab can be formed separate from the curtain airbag and stitched or otherwise connected to the curtain airbag.

According to another aspect, alone or in combination with any other aspect, the apparatus can further include a retainer. The fastener can include a threaded fastener having a head and a shank. The shank can extend though the mounting tab apertures and the bracket aperture. The retainer can slide onto the shank to retain the threaded fastener positioned extending through the mounting tab apertures and the bracket aperture and retain the bracket in the pocket.

According to another aspect, alone or in combination with any other aspect, the mounting tab can comprise overlying layers of airbag material including a first portion folded over onto a second portion to define the pocket. A portion of the first portion can be positioned between the head of the fastener and the bracket. The bracket can be positioned in the pocket between the first and the second portions. A portion of the second portion can be positioned between the bracket and the retainer.

According to another aspect, alone or in combination with any other aspect, the bracket can comprise a flat plate with semicircular end portions and rectilinear side portions that extend between the end portions.

According to another aspect, alone or in combination with any other aspect, the mounting tab can further comprise at least one secondary aperture. The apparatus can further comprise a secondary fastener extending through the secondary aperture.

According to another aspect, alone or in combination with any other aspect, a portion of the fastener and a portion of the secondary fastener can be configured to extend into a support structure of the vehicle to mount the apparatus to the support structure.

According to another aspect, alone or in combination with any other aspect, the curtain airbag can be a one-piece woven (OPW) curtain airbag. The mounting tab can comprise an integral woven portion of the OPW curtain airbag. The mounting tab can comprise a first section and a second section. The first section can comprise a portion of the OPW curtain airbag that is folded over and stitched or otherwise connected to form the pocket and to form the overlying layers of airbag material through each of which the mounting tab aperture extends. The second section can comprise the secondary aperture.

According to another aspect, alone or in combination with any other aspect, a portion of the fastener can be configured to extend into a support structure of the vehicle to mount the apparatus to the support structure.

According to another aspect, alone or in combination with any other aspect, the support structure can be a roof rail of the vehicle.

According to another aspect, alone or in combination with any other aspect, the curtain airbag can comprise a plurality of mounting tabs spaced along a length of an upper portion of the curtain airbag. The apparatus can further comprise a bracket and a fastener for each mounting tab to secure the apparatus to a support structure of the vehicle.

According to another aspect, an inflatable curtain assembly can include the apparatus and an inflator for inflating the curtain airbag from the stored condition to the deployed condition.

According to another aspect, a vehicle safety system can include the inflatable curtain assembly and an airbag controller configured to actuate the inflator in response to sensing the occurrence of an event for which occupant protection is desired.

According to another aspect, alone or in combination with any other aspect, an apparatus for helping to protect an occupant of a vehicle can include a one-piece woven (OPW) curtain airbag inflatable from a stored condition to a deployed condition in which the OPW curtain airbag is deployed between a side structure of the vehicle and the vehicle occupant. The OPW curtain airbag can comprise two fabric layers that are interwoven in portions to define at least one inflatable chamber and a mounting tab comprising a pocket. The mounting tab can comprise the two fabric layers overlying one another that, together with the interwoven portions, define the pocket. Each of the two fabric layers at the mounting tab can have a mounting tab aperture extending therethrough. A bracket can comprise a plate with a bracket aperture extending therethrough. The bracket can be positioned in the pocket so that the bracket aperture is aligned with the mounting tab apertures. A fastener can have a portion extending though the mounting tab apertures and the bracket aperture. The fastener can block the bracket from removal from the pocket.

BRIEF DESCRIPTION OF THE DRAWINGS

The foregoing and other features of the invention will become apparent to one skilled in the art to which the invention relates upon consideration of the following description of the invention with reference to the accompanying drawings, in which.

DETAILED DESCRIPTION OF THE INVENTION

Figure 1:
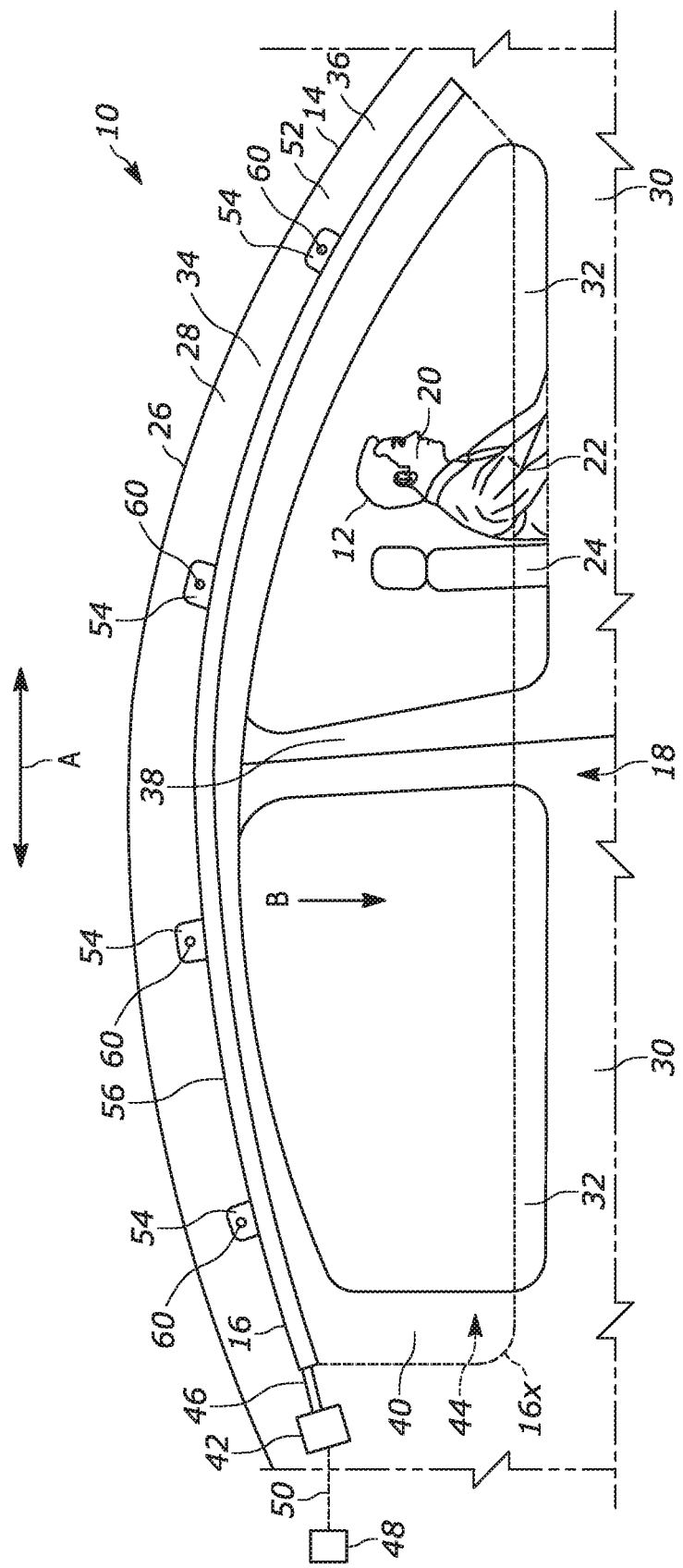
FIG. 1 is a schematic side view illustrating an apparatus for helping to protect an occupant of a vehicle.

An apparatus 10 for helping to protect an occupant 12 of a vehicle 14 includes an inflatable vehicle occupant protection device 16 in the form of an airbag, such as a curtain airbag, for helping to protect the occupant in the event of a side impact to the vehicle. In the embodiment illustrated in FIG. 1, the curtain airbag 16 is shown on the driver side 18 of the vehicle 14 for helping to protect driver side vehicle occupants. Those skilled in the art will appreciate that the apparatus 10 disclosed herein could be adapted for use on a passenger side (not shown) of the vehicle 14 for helping to protect passenger side vehicle occupants.

Portions of the occupant 12, such as the occupant's head 20 and torso 22, are depicted in FIG. 1. The vehicle 14 includes at least one vehicle seat 24 for vehicle occupants 12. The vehicle 14 also includes a vehicle roof 26 and a side structure 28. The vehicle 14 has two rows of seating which help dictate the configuration of the side structure 28. In the example configuration shown in FIG. 1, the side structure 28 of the vehicle 14 includes two vehicle doors 30, two side windows 32, a roof rail 34, an A-pillar 36, a B-pillar 38, and a C-pillar 40. The apparatus 10 can, however, be applied to vehicles having any number of rows, and thus any side structure configuration.

The curtain airbag 16 can be constructed of any suitable material, such as nylon (e.g., woven nylon 6-6 yarns), and can be constructed in any suitable manner. For example, the curtain airbag 16 may have a one-piece woven (OPW) construction in which the curtain airbag is woven as a single piece of material. As another example, the curtain airbag 16 can include more than one piece of material. If more than one piece is used, the pieces can be interconnected by known means, such as stitching, ultrasonic welding, heat bonding, or adhesives, to form the curtain airbag 16. The curtain airbag 16 can be uncoated, coated with a material, such as a gas impermeable urethane, or laminated with a material, such as a gas impermeable film. The curtain airbag 16 thus can have a gas-tight or substantially gas-tight construction. Those skilled in the art will appreciate that alternative materials, such as polyester yarn, and alternatives coatings, such as silicone, can also be used to construct the curtain airbag 16.

An inflator 42 is operably connected to an inflatable volume 44 of the curtain airbag 16 in any known manner. In the example configuration of FIG. 1, the inflator 42 is connected to the inflatable volume 44 of the curtain airbag 16 through a fill tube 46. The inflator 42 is actuatable to provide inflation fluid to the inflatable volume 44 of the curtain airbag 16 through the fill tube 46 to inflate and deploy the curtain airbag from a stored condition, indicated by solid lines at 16 in FIG. 1, to a deployed condition, indicated by dashed lines at 16x in FIG. 1. The inflator 42 can be of any known type, such as stored gas, solid propellant, augmented, or hybrid. An airbag controller 48 can be operatively connected to the inflator 42 via lead wires 50. The airbag controller 48 is configured to actuate the inflator 42 in response to sensing the occurrence of an event for which occupant protection is desired, such as a collision.

As shown in the example configuration of FIG. 1, the curtain airbag 16 and the inflator 42 are mounted to a support structure 52 of the vehicle 14. At least a portion of the curtain airbag 16 is contained in the support structure 52 when the curtain airbag is in the stored condition. The curtain airbag 16 is inflatable and deployable by the inflator 42 from the stored condition away from the support structure 52 and toward the deployed condition. In the deployed condition, the curtain airbag 16 is positioned between the side structure 28 and the vehicle occupant 12. The support structure 52 can be any structure in the vehicle 14 that will accommodate the curtain airbag 16 being deployed therefrom so that the deployed curtain airbag is positioned between the side structure 28 and the vehicle occupant 12. In the example configuration shown in FIG. 1, the support structure 52 is the roof rail 34.

In order to mount the curtain airbag 16 to the roof rail 34, the curtain airbag comprises a plurality of mounting tabs 54 spaced in a vehicle fore-aft direction, as indicated by an arrow "A" in FIG. 1, along a length of an upper portion 56 of the curtain airbag. A bracket 58 and a fastener 60 are provided at each mounting tab 54 to secure the apparatus 10 to the roof rail 34. It will be appreciated that the mounting tabs 54 may have various configurations, some of which will be discussed below. FIGS. 2-29 depict example configurations of the curtain airbag 16 and the mounting tabs 54. The example configurations are not necessarily exclusive of each other. Those skilled in the art will appreciate that certain features can be shared and/or combined between the example configurations whether expressly stated, shown, or not. Common elements shared between the example configurations of the mounting tabs 54 include common reference characters. Although only one mounting tab 54 of the plurality of mounting tabs is depicted in each of the FIGS. 2-29, the descriptions of the depicted mounting tabs are applicable to the mounting tabs at any of the plurality of mounting tabs' locations on the curtain airbag 16.

Figure 2:
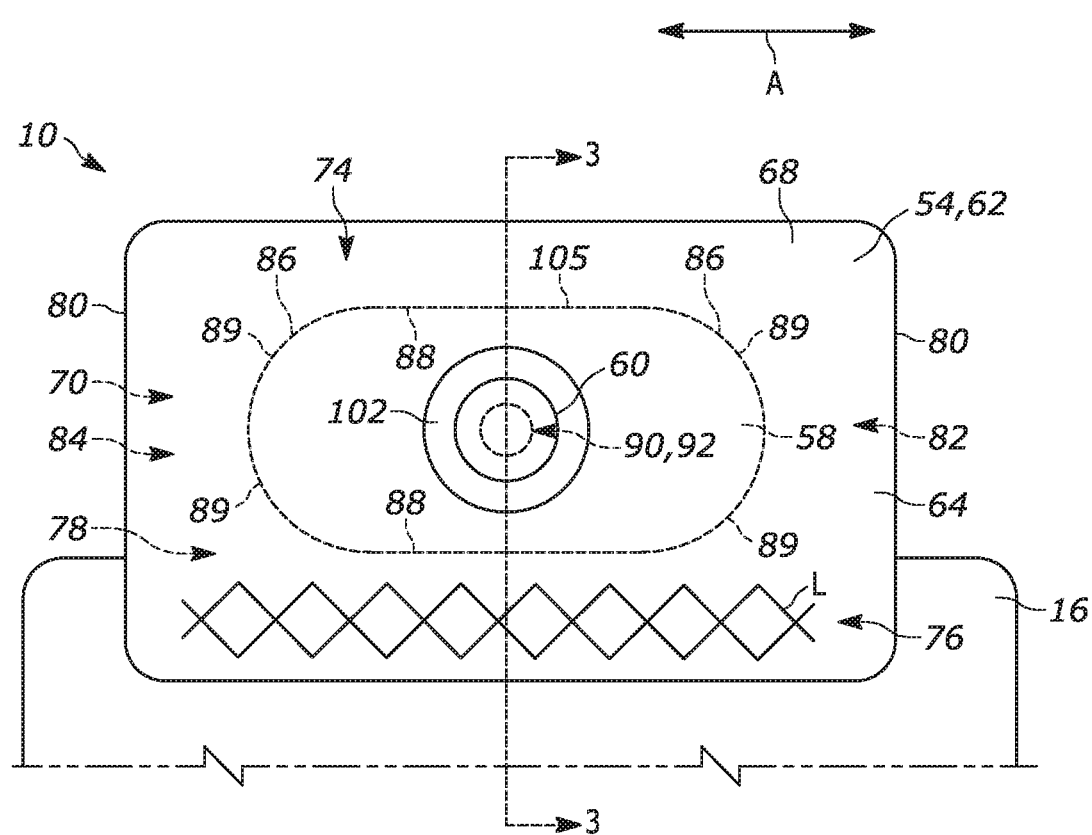
FIG. 2 is a side view of an element of the apparatus of FIG. 1, including a first configuration for a portion of the apparatus.
Figure 3:
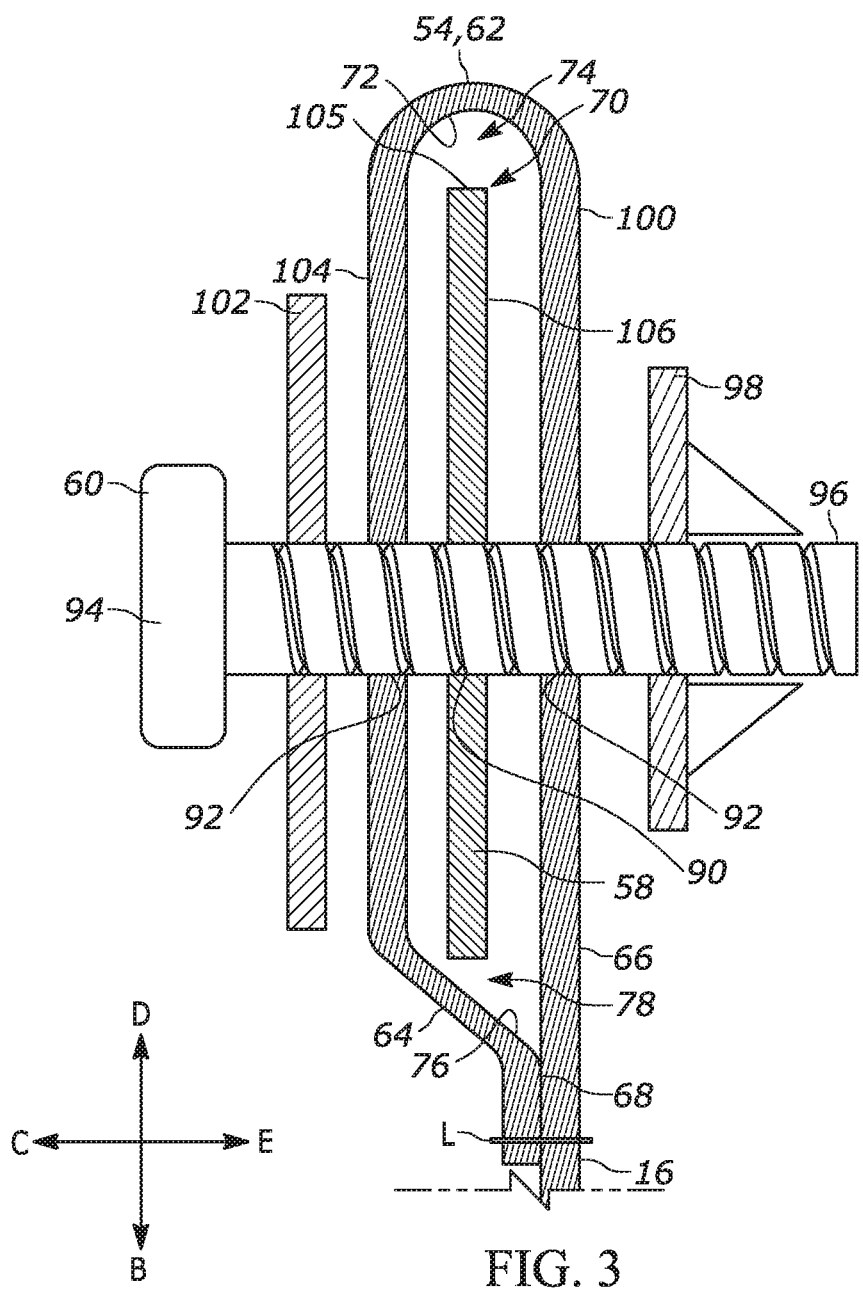
FIG. 3 is a sectional view of a portion of the apparatus of FIG. 2.

FIGS. 2-3 depict an example configuration for the mounting tabs 54, referred to as a mounting tab A 62. The curtain airbag 16 has a one-piece woven (OPW) construction and the mounting tab A 62 comprises an integral, single layer woven portion of the OPW curtain airbag. A first portion 64 of the mounting tab A 62 is folded over onto a second portion 66 of the mounting tab A to define overlying layers 68 of the mounting tab A. The folded over first portion 64 can be a single layer portion of the curtain airbag 16 that is stitched or otherwise connected, as indicated by the stitch/connection line "L" in FIGS. 2-3, to the second portion 66 and/or to a portion of the curtain airbag adjacent to the mounting tab A 62. The folded over and stitched portions 64, 66 form a pocket 70 of the mounting tab A.

As shown in FIG. 3, the pocket 70 is defined by the overlying layers 68 of OPW curtain airbag material, a folded end portion 72 at an upper side portion 74 of the pocket, and a connecting end portion 76 at a lower side portion 78 of the pocket. The pocket 70 of the mounting tab A 62 extends in the vehicle fore-aft direction A. The pocket 70 has at least one open end portion 80 that faces in the vehicle fore-aft direction A. In the example configuration shown in FIG. 2, the pocket 70 has two open end portions 80 that face the vehicle fore-aft direction A at fore and aft side portions 82, 84 of the pocket. The bracket 58 is inserted through one of the open end portions 80 of the pocket 70 and positioned in the pocket. The overlying layers 68, the folded end portion 72 at the upper side portion 74 of the pocket 70, and the connecting portion 76 at the lower side portion 78 of the pocket that define the pocket substantially prevent the bracket 58 from rotating from a desired position within the pocket.

The bracket 58 is a generally flat plate that can be at least partially formed from steel, aluminum, plastic, any other suitable material, or any combination thereof. The bracket 58 can have any desired shape capable of being positioned in a pocket 70 designed to fit such shape. The bracket 58 can be discorectangular (rectangular with rounded ends), circular, or any other shape having rounded/dulled edges. The bracket 58 (see FIG. 2) is a flat discorectangular plate having semi-circular end portions 86 and rectilinear side portions 88 that extend between the semi-circular end portions. The bracket 58 thus has rounded/dulled edges 89.

As shown in FIGS. 2-3, the bracket 58 further includes a bracket aperture 90 extending therethrough. The bracket 58 is positioned in the pocket 70 so that the bracket aperture 90 is aligned with mounting tab apertures 92 that extend through each of the first and the second portions 64, 66 of the overlying layers 68. A portion of the fastener 60 extends through the mounting tab apertures 92 and the bracket aperture 90 to block the bracket 58 from being removed from the pocket 70. A portion of the fastener 60 is also configured to extend into the roof rail 34 of the vehicle 14 to mount the apparatus 10 to the roof rail. The fastener 60 can be any fastener that is capable of withstanding the deployment forces of the deploying curtain airbag 16 and capable of extending through the mounting tab apertures 92, the bracket aperture 90, and into the roof rail 34 of the vehicle 14.

In the example configuration of FIGS. 2-3, the fastener 60 is a threaded fastener having a head 94 and a shank 96. The shank 96 extends through the mounting tab apertures 92 and the bracket aperture 90. A portion of the shank 96 is also configured to extend into the roof rail 34 of the vehicle 14 to mount the apparatus 10 to the roof rail. Although the mounting tab apertures 92 have been depicted as being substantially the same size as the shank 96 of the threaded fastener 60, the mounting tab apertures could be larger than what is depicted to ease the installation process of the curtain airbag 16 by allowing at least some movement between the mounting tab and the shank.

The apparatus 10 can include a retainer 98 that slides onto the shank 96 to retain the threaded fastener 60 positioned extending through the mounting tab apertures 92 and the bracket aperture 90. The retainer 98, in conjunction with the shank 96, also retains the bracket 58 in the pocket 70. When the retainer 98 is provided, the retainer is positioned on an outboard side 100 of the mounting tab A 62 so that a portion of the second portion 66 of the overlying layers 68 is positioned between the bracket 58 and the retainer. A washer 102 also can be slid onto the shank 96 of the threaded fastener 60 and positioned on an inboard side 104 of the mounting tab A 62 so that the washer is positioned between the head 94 of the threaded fastener and the first portion 64 of the overlying layers 68. Further, when the washer 102 is provided, the first portion 64 of the overlying layers 68 is positioned between the washer and the bracket 58.

Upon the occurrence of an event for which occupant protection is desired, the airbag controller 48 actuates the inflator 42 to provide inflation fluid to the inflatable volume 44 of the curtain airbag 16 to inflate and deploy the curtain airbag from the stored condition to the deployed condition. The curtain airbag 16 deploys in a generally downward direction, as indicated by an arrow "B" in FIGS. 1 and 3, and in a generally inboard direction, as indicated by an arrow "C" in FIG. 3, away the roof rail 34. The deploying curtain airbag 16 creates deployment forces that act on the mounting tabs 54, the brackets 58, and the fasteners 60. These deployment forces follow the trajectory of the curtain airbag 16, and thus generally act in the downward and the inboard directions B, C. The deployment forces acting on the mounting tabs 54 urge the mounting tabs 54 away from the roof rail 34 in both the downward and the inboard directions B, C, which can cause the mounting tabs to tear and/or detach from the roof rail 34. The fastener 60 and the bracket 58 are provided at each of the mounting tabs 54 to counteract these deployment forces and to help prevent the mounting tabs 54 from tearing and/or detaching from the roof rail 34.

A portion of the downward deployment forces are exerted on the shank 96 of the threaded fastener 60 through the mounting tab apertures 92. Because the threaded fastener 60 is held in place by being inserted into the roof rail 34, the threaded fastener counteracts the downward deployment forces at the mounting tab apertures 92 to prevent the mounting tab A 62 from moving in the downward direction. This counteraction can be perceived as a force in the upward direction, as indicated by an arrow "D" in FIG. 3. A portion of the downward deployment forces are also exerted on the bracket 58 as the folded end portion 72 at the upper side portion 74 of the pocket 70 exerts a portion of the downward deployment forces onto the upper edge 105 of the bracket. The bracket 58 is prevented from moving in the downward direction B by the inserted threaded fastener 60. Because the bracket 58 is held in place, the bracket counteracts the downward deployment forces at the folded end portion 72 to prevent the mounting tab A 62 from moving in the downward direction B. This counteraction can be perceived as a force in the upward direction D. Thus, both of the threaded fastener 60 and the bracket 58 counteract the downward deployment forces to help hold the mounting tab A 62 in place mounted to the roof rail 34.

The bracket 58 not only counteracts the downward deployment forces, the bracket also helps prevent and/or limit the development of tearing/damage on the mounting tab A 62 caused by the downward deployment forces. The mounting tab apertures 92 are a location in the mounting tab A 62 where stress caused by the deployment forces concentrates, and thus the mounting tab apertures are stress risers. For example, if the bracket 58 was not provided in the apparatus 10, a significant amount of stress could develop at the mounting tab apertures 92 due to the downward deployment forces being exerted only on the shank 96 through the mounting tab apertures. This concentration of stress at the mounting tab apertures 92 could result in the development of tearing/damage on the mounting tab A 62 at the mounting tab apertures. The bracket 58 being provided in the pocket 70 helps to avoid the concentration of stress at the mounting tab apertures 92 because the downward deployment forces are split between the mounting tab apertures 92 and the folded end portion 72 of the pocket 70. The split of the downward deployment forces prevents the entire load of the downward deployment forces from being exerted on the shank 96 through the mounting tab apertures 92. The inclusion of the bracket 58 in the pocket 70 thus helps to minimize the concentration of stress at the mounting tab apertures 92 to reduce the development of tearing/damage on the mounting tab A 62 at the mounting tab apertures.

The arrangement of the mounting tab A 62, the bracket 58, the fastener 60, and the roof rail 34 also helps to avoid the concentration of stress at the mounting tab apertures 92. The mounting tab A 62 is double-pinned when mounted to the roof rail 34. When the mounting tab A 62 is mounted to the roof rail 34, the first portion 64 of the mounting tab A is pinned between the bracket 58 and either the head 94 of the threaded fastener 60 or the washer 102, and the second portion 66 of the mounting tab A is pinned between the bracket and the roof rail. Instead of being concentrated at the mounting tab apertures 92, the stress caused by the deployment forces is distributed to the peripheries where the first and the second portions 64, 66 of the mounting tab A 62 are pinned. For example, stress that would have been concentrated at the mounting tab aperture 92 of the first portion 64 of the mounting tab A 62 is distributed to the periphery of the bracket 58 because the first portion of the mounting tab A is pinned between the bracket and the roof rail 34. Stress that would have been concentrated at the mounting tab aperture 92 of the second portion 66 of the mounting tab A 62 is distributed either to the periphery of the head 94 of the threaded fastener 60 or the periphery of the washer 102 because the second portion of the mounting tab A is pinned between the bracket 58 and either the head of the threaded fastener or the washer. Thus, in double-pinning the mounting tab A 62, the stress caused by the deployment forces is distributed over a larger surface area of the mounting tab A to help avoid the concentration of stress at the mounting tab apertures 92 and to help minimize the development of tearing/damage on the mounting tab A at the mounting tab apertures.

The shape of the bracket 58 also helps to prevent and/or limit the development of tears/damage on the mounting tabs 54 caused by the downward deployment forces. The bracket 58 is discorectangular with rounded/dulled edges 89 (see FIG. 2). During deployment of the curtain airbag 16, the folded end portion 72 of the pocket 70 exerts downward deployment forces onto an upper side portion 105 of the bracket 58. If the rounded/dulled edges 89 at the upper side portion 105 of the bracket 58 were sharp, 90 degrees and not rounded/dulled, the edges could dig into at least the folded end portion 72 of the pocket 70 and cause damage and/or a tear to form in the mounting tab A 62. Thus, by having the rounded/dulled edges 89, the bracket 58 limits and/or prevents the development of tearing/damage in the mounting tab A 62.

A portion of the inboard deployment forces is exerted on the head 94 of the threaded fastener 60 during deployment of the curtain airbag 16. Because the threaded fastener 60 is held in place, the head 94 of the threaded fastener counteracts the inboard deployment forces to prevent the mounting tab from moving in the inboard direction C. This counteraction can be perceived as a force in the outboard direction, as indicated by an arrow "E" in FIG. 3. A portion of the inboard deployment forces at the mounting tab A 62 is also exerted on a first face 106 of the bracket 58. The bracket 58 is prevented from moving in the inboard direction C by the head 94 of the inserted threaded fastener 60. The washer 102, when provided, can also prevent the bracket 58 from moving in the inboard direction C as it is held in place by the head 94 of the inserted threaded fastener 60. Because the bracket 58 is held in place, the bracket counteracts the inboard deployment forces at the mounting tab A 62 to prevent the mounting tab A from moving in the inboard direction C. This counteraction can be perceived as a force in the outboard direction E. Thus, both of the threaded fastener 60 and the bracket 58 counteract the inboard deployment forces to help hold the mounting tab A 62 in place mounted to the roof rail 34.

The bracket 58 not only counteracts the inboard deployment forces, the bracket also helps prevent the mounting tabs A 62 from sliding in the inboard direction C off of the threaded fastener 60. For example, the head 94 of the threaded fastener 60 covers only a portion of the adjacent surface area of the mounting tab A 62 and substantially prevents only that portion from moving in the inboard direction C. Without the bracket 58 present, the inboard deployment forces could cause a portion of the mounting tab A 62 outside of the portion covered by the head 94 to move in the inboard direction C and surround and/or envelop the head of the threaded fastener 60. This movement of the mounting tab A 62 carries the risk of the mounting tab eventually sliding in the inboard direction C off of the shank 96 and the head 94 of the threaded fastener 60. The bracket 58 prevents a larger portion of the mounting tab A 62 from moving in the inboard direction C than what the head 94 of the threaded fastener 60 does alone because the bracket is larger and covers more surface area on the mounting tab A than the head of the threaded fastener (see FIG. 2). By preventing a larger portion of the mounting tab A 62 from moving in the inboard direction C, the bracket 58 substantially prevents and/or limits the ability of the inboard deployment forces to cause the mounting tab A to surround and/or envelope the head 94 of the threaded fastener 60. Thus, the bracket 58 not only prevents the movement of the mounting tab A 62 in the inboard direction C, the bracket, with its relatively large mounting tab surface area coverage, also prevents the mounting tab A from sliding in the inboard direction off of the threaded fastener 60.

The washer 102, when provided, also prevents the movement of the mounting tab A 62 in the inboard direction C and prevents the mounting tab A from sliding in the inboard direction off of the threaded fastener 60 in the same manner as the bracket 58. However, because the bracket 58 is provided in the apparatus 10, the size, strength, and need for the washer 102 in the apparatus is not as crucial as it would be if there was no bracket. This allows for a potential cost savings when choosing which washer to provide or whether to provide a washer 102 at all.

Although not described or depicted, the interaction between the deployment forces, the mounting tabs 54, the brackets 58, the fasteners 60, and the washers 102 is applicable to any of the example configurations of the mounting tabs in the same manner as described and depicted for the mounting A 62.

Figure 4:
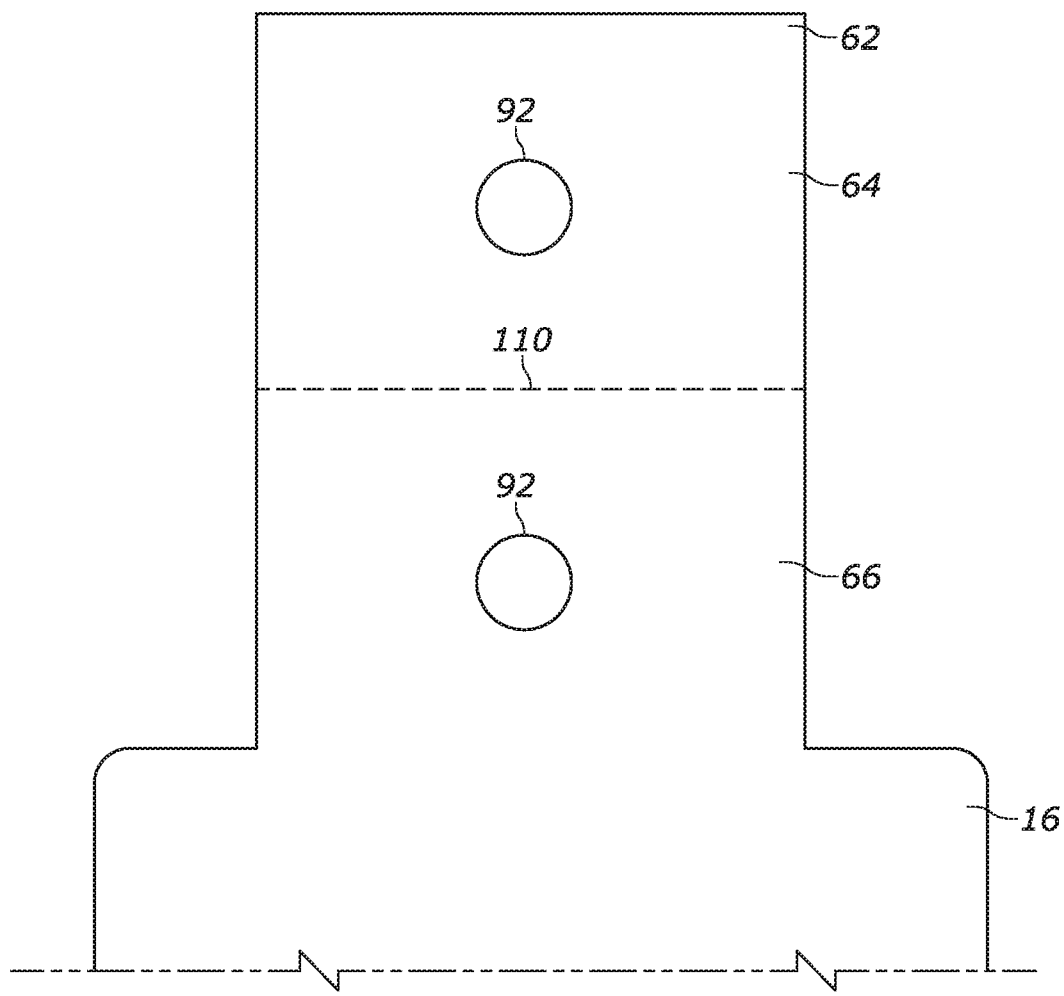
FIGS. 4-12 illustrate a method for constructing a portion of the apparatus of FIG. 2.
Figure 5:
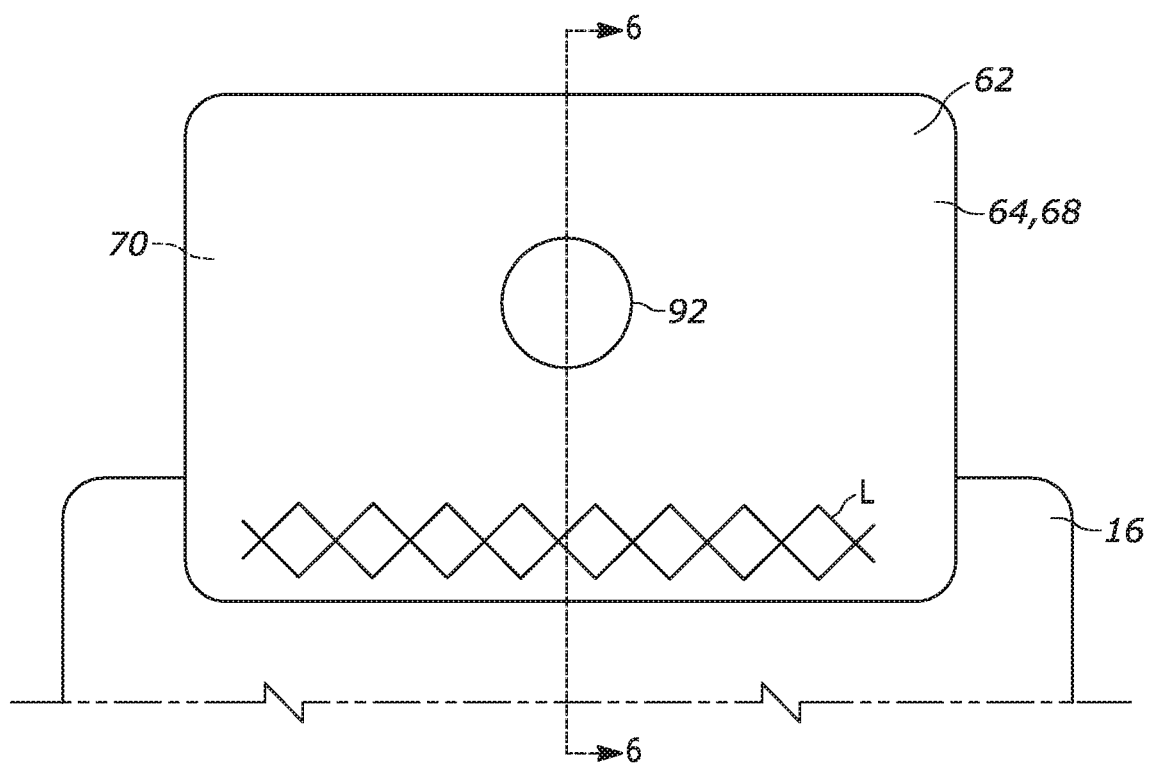
Figure 6:
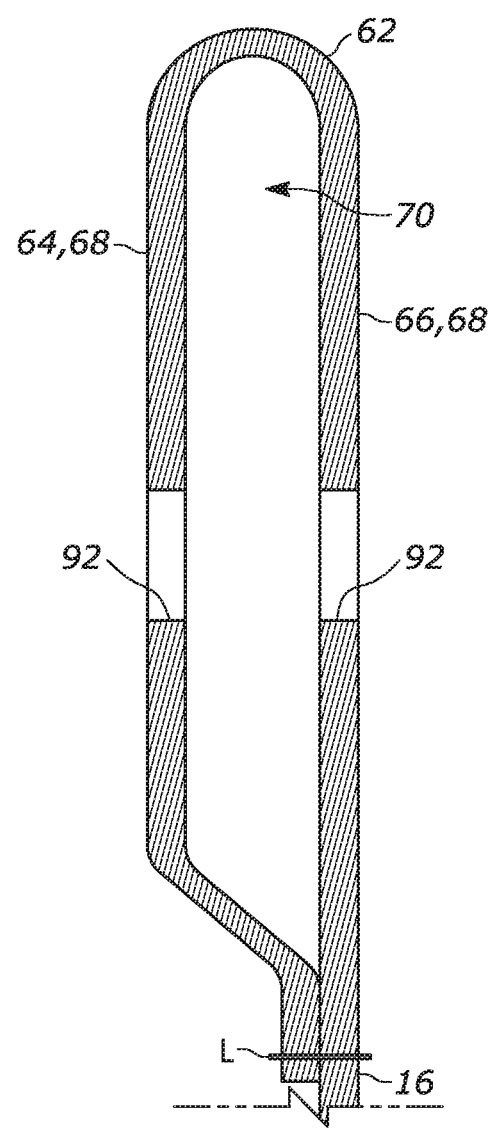

FIGS. 4-12 illustrate an example process by which the mounting tab A 62 can be assembled and arranged with the bracket 58, the fastener 60, the retainer 98, and the washer 102. As shown in FIG. 4, the mounting tab A 62 is an integral portion of the OPW curtain airbag 16 having the first and the second portion 64, 66 with the mounting tab apertures 92 extending therethrough. As shown in FIGS. 4-6, the first portion 64 is folded over about a fold-line 110 onto the second portion 66 to define the overlying layers 68 of the mounting tab A 62. Once folded over, the first portion 64 is aligned with the second portion 66 with the mounting tab apertures 92 being aligned with one another. The first portion 64 is then stitched or otherwise connected, as indicated by the stitch/connection lines "L" in FIGS. 5-6, to the second portion 66 and/or to a portion of the OPW curtain airbag 16 adjacent to the mounting tab A 62 to form the pocket 70. Additional layers of material, such as airbag material, can be stitched or otherwise connected to the outboard and/or inboard sides 100, 104 of the mounting tab A 62 to further reinforce the curtain airbag 16 at the mounting tab A. These additional layers of material can be cut from the airbag material that is leftover after the curtain airbag 16 has been cut and formed.

Figure 7:
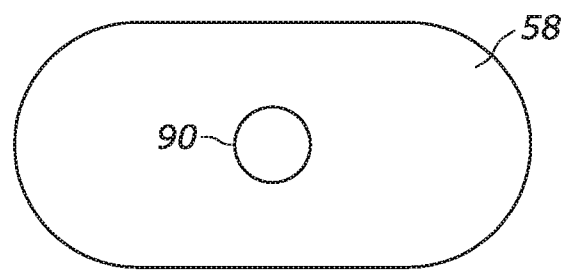
Figure 8:
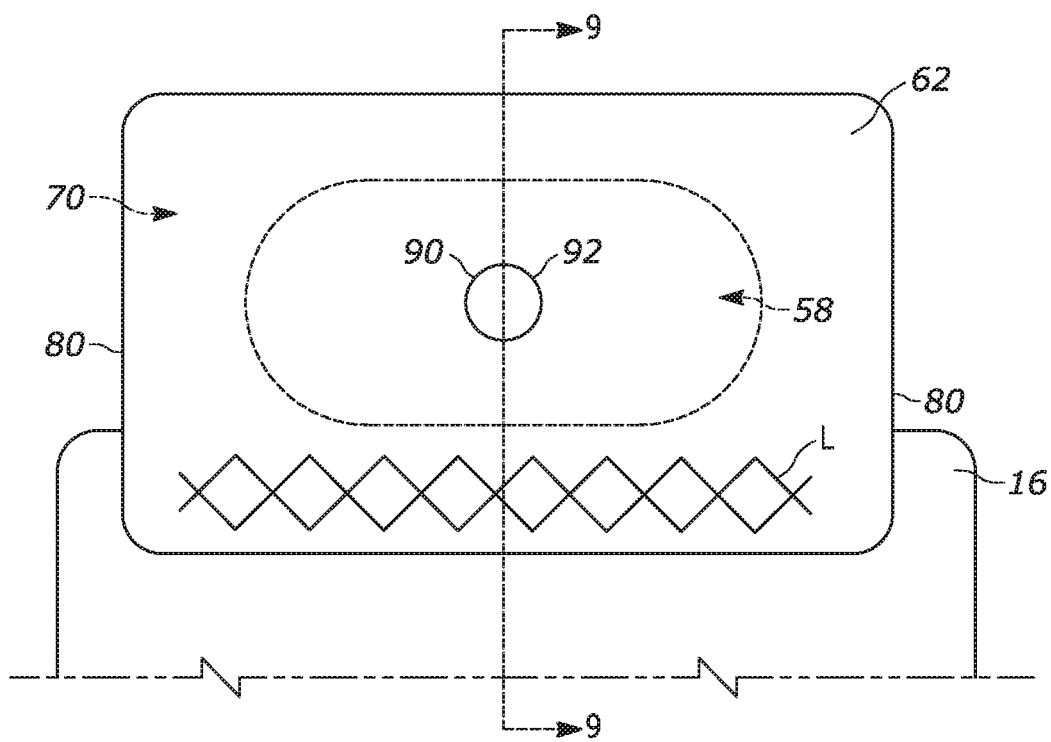
Figure 9:
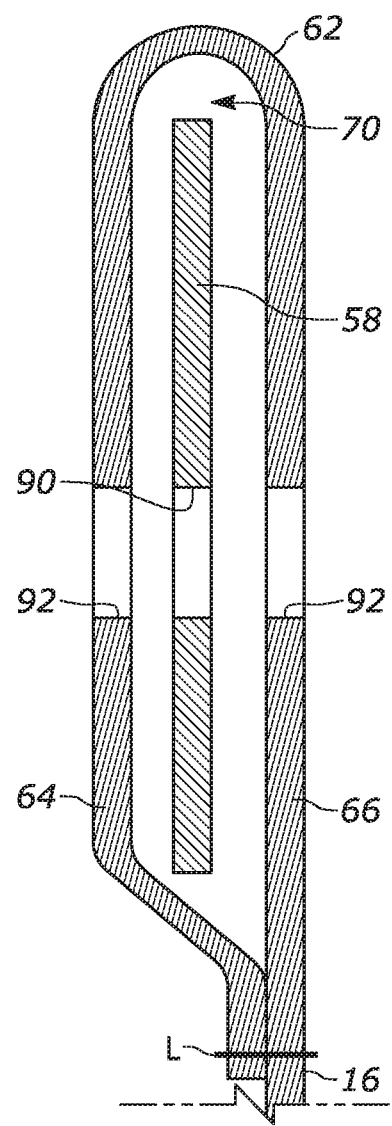
Figure 10:
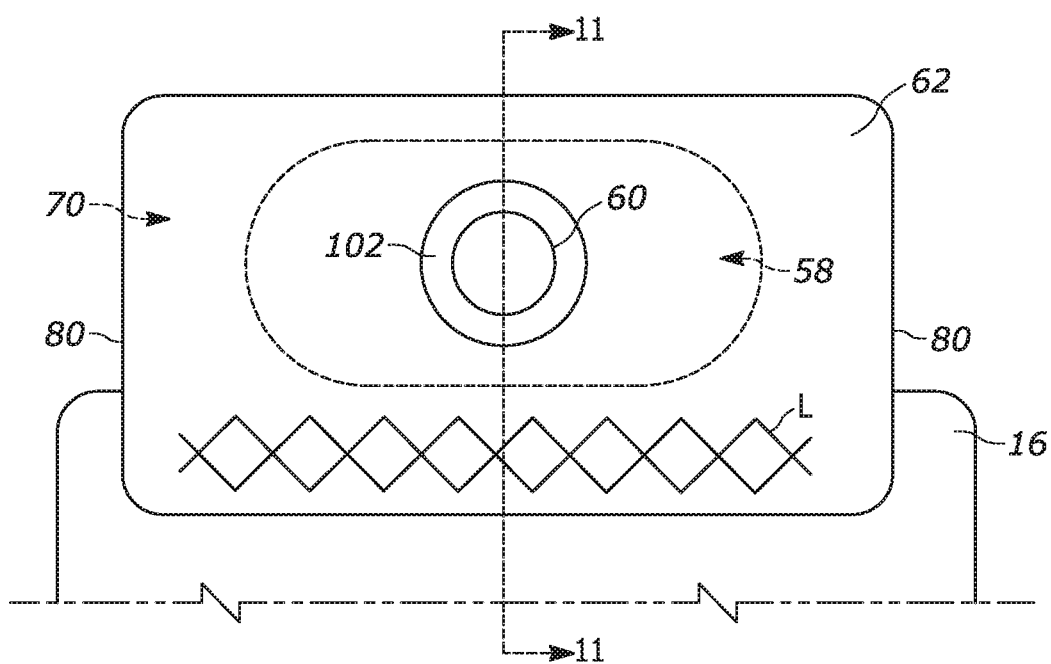
Figure 11:
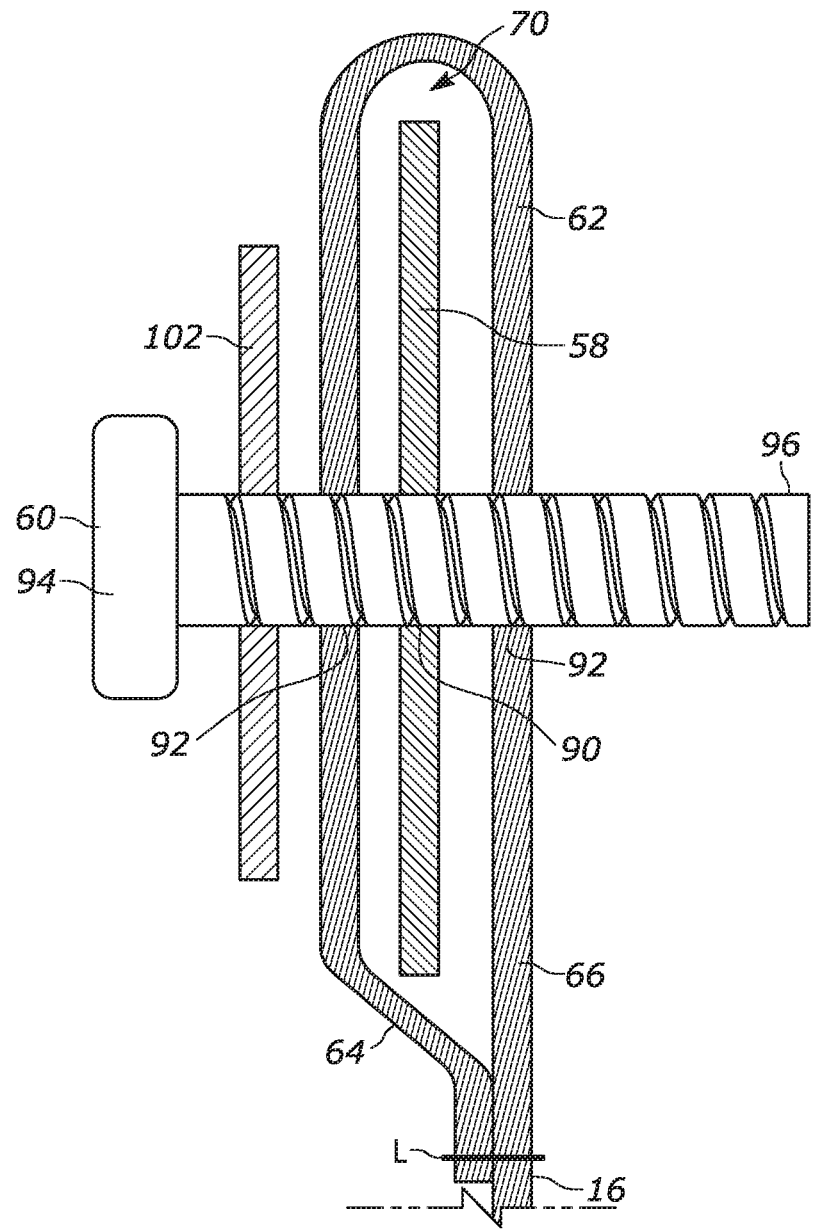
Figure 12:
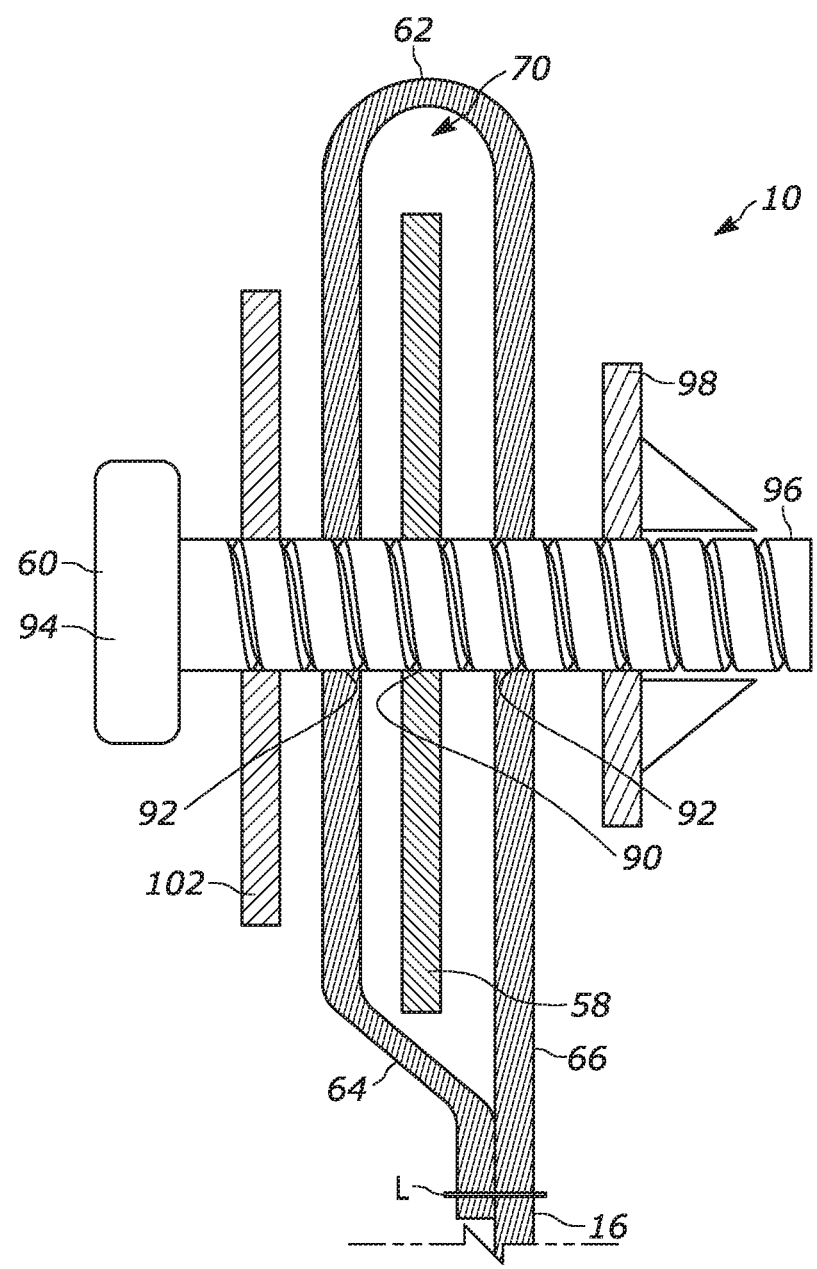

As shown in FIGS. 7-9, the bracket 58 is provided and inserted into the pocket 70 through one of the open end portions 80 of the pocket. Once inserted, the bracket 58 is positioned in the pocket 70 with the bracket aperture 90 being aligned with the mounting tab apertures 92. The washer 102 is then slid onto the shank 96 of the threaded fastener 60. Alternatively, the washer 102 may be pre-assembled to the threaded fastener 60 so that the separate step of sliding the washer onto the shank 96 of the threaded fastener is not required. As shown in FIGS. 10-11, with the washer 102 on the shank 96, a portion of the shank is inserted through the mounting tab aperture 92 of the first portion 64 of the overlying layers 68, the bracket aperture 90, and through the mounting tab aperture 92 of the second portion 66 of the overlying layers. The head 94 of the threaded portion 60 and the washer 102 are thus positioned on the inboard side 104 of the mounting tab A 62. As shown in FIG. 12, with a portion of the shank 96 extending through the mounting tab apertures 92 and the bracket aperture 90, the retainer 98 is slid onto the shank from the outboard side 100 of the mounting tab A 62. Once the mounting tab A 62 is assembled and arranged with the bracket 58, the fastener 60, the retainer 98, and the washer 102, a portion of the shank 96 of the threaded fastener can be inserted into the support structure 52 of the vehicle 14, such as the roof rail 34, to mount the apparatus 10 to the support structure.

Figure 13:
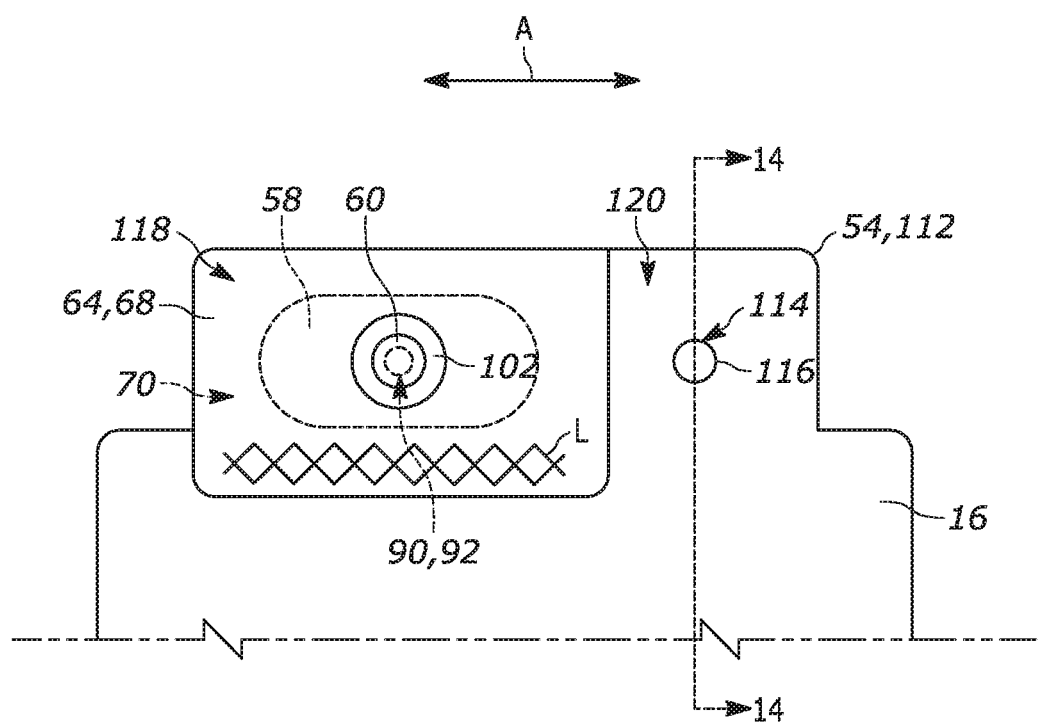
FIG. 13 is a side view of an element of the apparatus of FIG. 1, including another configuration for a portion of the apparatus.
Figure 14:
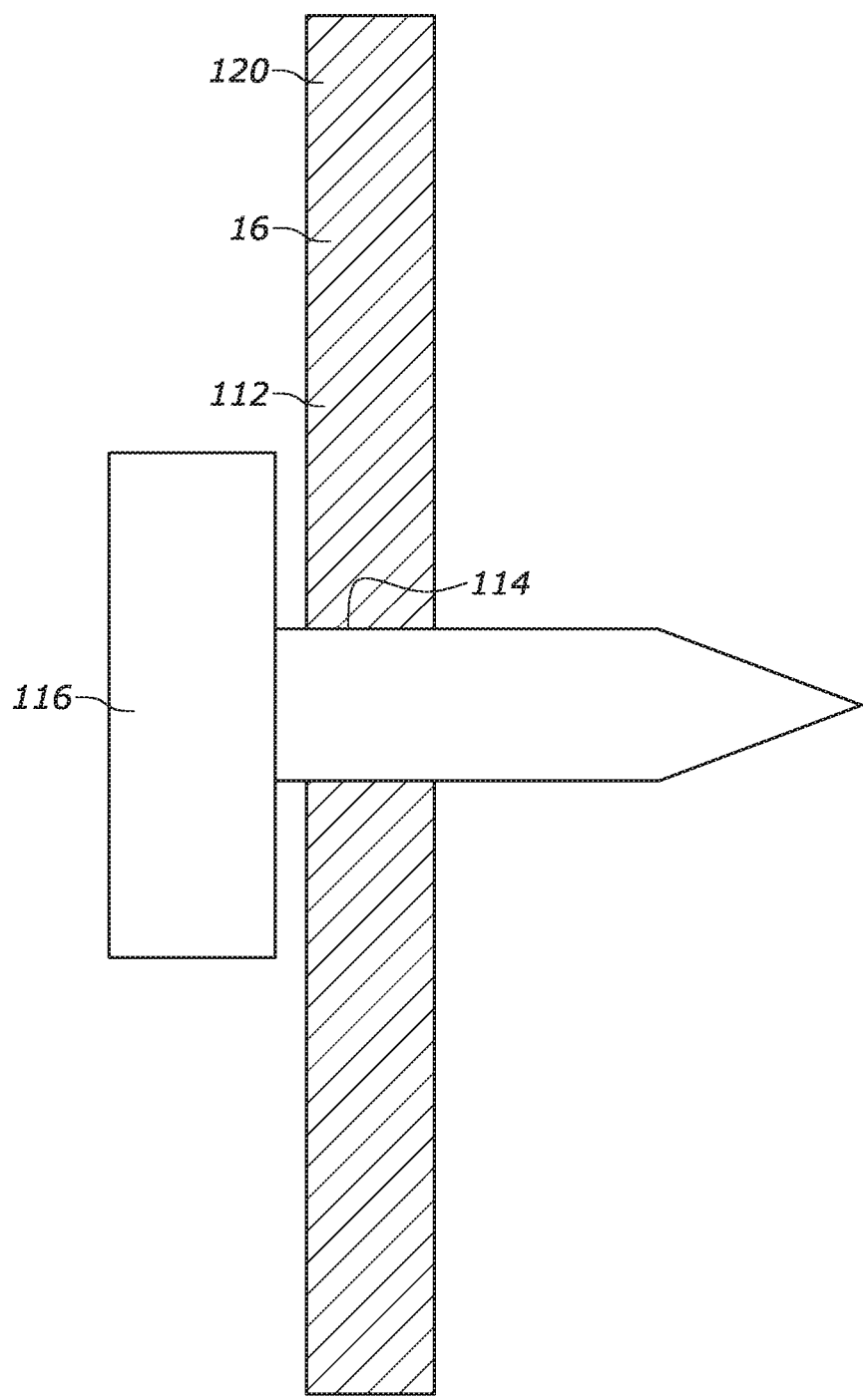
FIG. 14 is a sectional view of a portion of the apparatus of FIG. 13.
Figure 15:
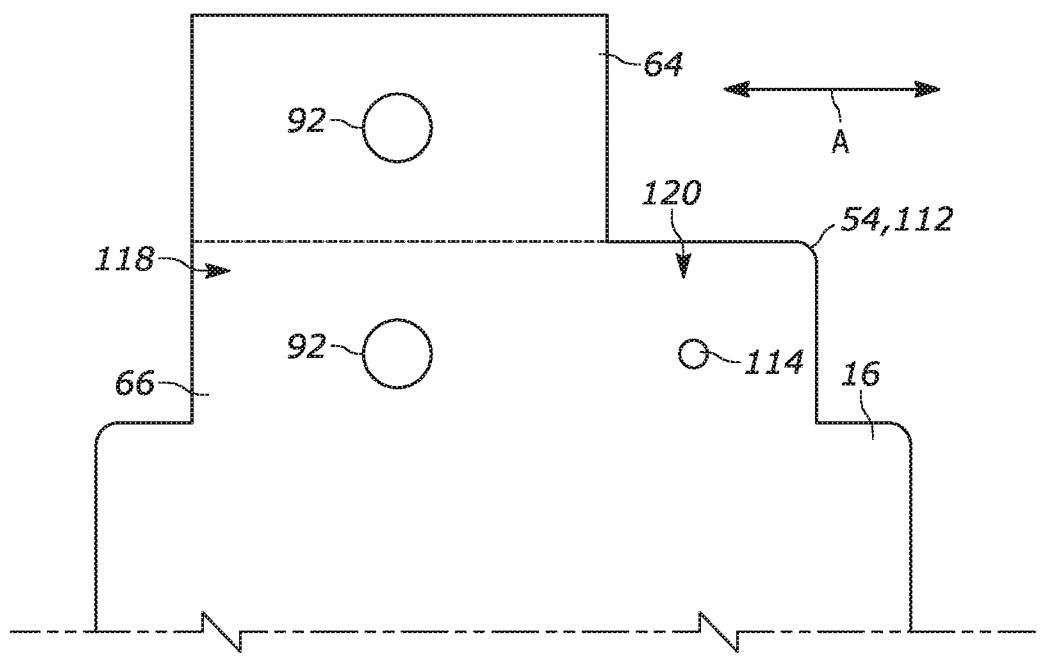
FIG. 15 is a side view of an element of the apparatus of FIG. 13.

FIGS. 13-15 depict an example configuration for the mounting tabs 54, referred to as a mounting tab B 112. The mounting tab B 112 is substantially similar to the mounting tab A 62, except that the mounting tab B further includes at least one secondary aperture 114 configured to receive a secondary fastener 116. The curtain airbag 16 has a OPW construction and the mounting tab B 112 comprises an integral woven portion of the OPW curtain airbag. The mounting tab B 112 has a first section 118 and a second section 120 that is adjacent to the first section in the vehicle fore-aft direction A. The first section 118 comprises the first portion 64 of the mounting tab B 112 that is folded over onto the second portion 66 of the mounting tab B and stitched or otherwise connected, as indicated by the stitch/connection line "L" in FIG. 13, to form the pocket 70 and to form the overlying layers 68 of airbag material. Similar to the mounting tab A 62, the mounting tab apertures 92 of the mounting tab B 112 extend through each of the first and second portions 64, 66 of the overlying layers 68.

The second section 120 of the mounting tab B 112 is adjacent to the second portion 66 of the overlying layers 68 in the vehicle fore-aft direction A. The second section 120 can be undivided from the second portion 66 of the overlying layers 68 so that a continuous surface of the OPW curtain airbag 16 is formed comprising both the second portion of the overlying layers and the second section (see FIG. 15). As shown in FIGS. 13-14, the second section 120 includes the secondary aperture 114 extending therethrough. A portion of the secondary fastener 116 extends through the secondary aperture 114 and is configured to extend into the support structure 52 of the vehicle 14 so that the fastener 60 and the secondary fastener together can be utilized mount the apparatus 10 to the support structure.

The secondary fastener 116 can be any fastener that is capable of withstanding at least a portion of the deployment forces of the curtain airbag 16 and capable of extending through the secondary aperture 114 and into the support structure 52 of the vehicle 14. In the example configuration of FIGS. 13-14, the secondary fastener 116 is a pin. The inclusion of the secondary aperture and fastener 114, 116 reinforces the connection between the mounting tab B 112 and the support structure 52. The inclusion of the secondary aperture and fastener 114, 116 also splits the deployment forces between the mounting tab apertures 92 and secondary aperture. The split of the deployment forces helps prevent the entire load of the deployment forces from being exerted on only through the mounting tab apertures 92. Thus, the inclusion of the secondary aperture and fastener 114, 116 helps to minimize the development of tearing/damage on the mounting tab apertures 92. The secondary fastener 116 additionally helps ease the installation of the curtain airbag 16 in the vehicle 14. The secondary fastener 116 is able to be pressed through the secondary aperture 114 and into the support structure 52 to fix the position of the curtain airbag 16 prior to the insertion of the fastener 60. The secondary fastener 116 thus helps hold the curtain airbag 16 in the desired position relative to the vehicle 14 so that the fastener 60 can be easily inserted into the support structure 52.

Figure 16:
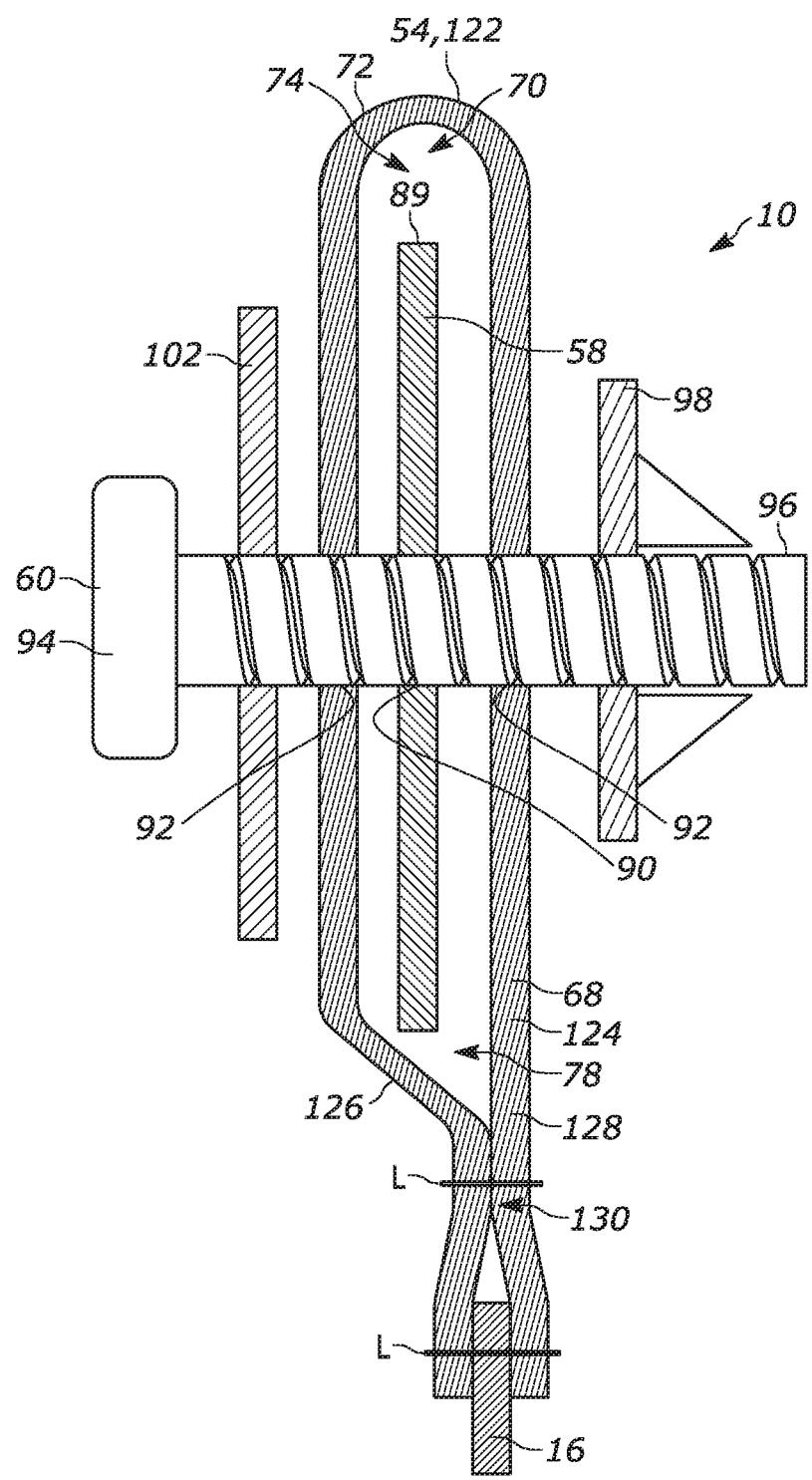
FIG. 16 is a sectional view of an element of the apparatus of FIG. 1, including another configuration for a portion of the apparatus.

FIG. 16 depicts an example configuration for the mounting tabs 54, referred to as a mounting tab C 122. The mounting tab C 122 can be formed separate from the curtain airbag 16 and then connected to the curtain airbag. The mounting tab C 122 can be formed from a length of material 124, such as from a single length of material or from a plurality of lengths of material that are connected to one another to collectively form the length of material. In the example configuration of FIG. 16, the mounting tab C 122 is formed from a single length of material 124. A first portion 126 of the single length of material 124 is folded over onto a second portion 128 of the single length of material to define the overlying layers 68 of the mounting tab C 122 each of which having the mounting tab aperture 92 extending therethrough. The folded over first portion 126 can be a single layer portion of the single length of material 124 that is stitched or otherwise connected to the second portion 128, as indicated by the stitch/connection lines "L" in FIG. 16.

The folded over and stitched portions 126, 128 form the pocket 70 of the mounting tab C 122.

Once the pocket 70 of the mounting tab C 122 is formed, a connecting portion 130 of the assembled mounting tab C can be interconnected to the curtain airbag 16 by known means, such as stitching, ultrasonic welding, heat bonding, or adhesives. In the example configuration of FIG. 16, the connecting portion 130 of the mounting tab C 122 includes portions of the first and second portions 126, 128 of the overlying layers 68 that are stitched to the curtain airbag 16. Although the first and second portions 126, 128 of the single length of material 124 at the connecting portion 130 of the mounting tab C 122 are shown on opposing sides of the curtain airbag 16, the first and second portions of the single length of material may be connected to the curtain airbag on the same side of the curtain airbag.

Alternatively, instead of being formed separate from the curtain airbag 16 and then connected to the curtain airbag, the mounting tab C 122 can be formed on the curtain airbag. For example, prior to the formation of the pocket 70, the second portion 128 of the single length of material 124 can be connected to the curtain airbag 16. Once connected, the first portion 126 of the single length of material 124 is folded over onto the second portion 128 of the single length of material to define the overlying layers 68 of the mounting tab C 122. The folded over first portion 126 can be a single layer portion of the single length of material 124 that is connected to the second portion 128 and/or to the curtain airbag 16. The folded over and stitched portions 126, 128 form the pocket 70 of the mounting tab C 122.

Forming the mounting tab C 122 from a separate length of material 124 can provide the benefit of having a cost effective use of airbag material. For example, the curtain airbag 16 can be cut from a nest, i.e., a length of airbag fabric. In certain cases, forming the mounting tabs 54 with the curtain airbag 16 can result in a less efficient use of the nest than if the mounting tabs were not formed with the curtain airbag. This is because more airbag material may be leftover as scrap after the curtain airbag 16 having mounting tabs 54 is cut and formed than if the curtain airbag was cut and formed without the mounting tabs. Any leftover scrap airbag material not used in the formation of the curtain airbag 16 having no mounting tabs 54 can be cut to form the separate length of material 124 utilized in the mounting tab C 122. Thus, in certain cases, by forming the mounting tab C 122 from a separate length of material 124, the nest can be utilized more efficiently.

FIGS. 17-22 depict an example configuration for the mounting tabs 54, referred to as a mounting tab D 132. The overlying layers 68 of the mounting tab D 132 include a mounting tab base 134 and a length of material 136 each of which having the mounting tab aperture 92. The mounting tab base 134 comprises an integral, single layer woven portion of an OPW curtain airbag 16. The length of material 136 of the mounting tab D 132 can be formed from a single length of material or from a plurality of lengths of material that are connected to one another to collectively form the length of material. In the example configuration of FIGS. 17-22, the length of material 136 of the mounting tab D 132 is formed from a single length of material.

The single length of material 136 includes opposing upper and lower side portions 138, 140, and opposing fore and aft side portions 142, 144 that extend between the upper and lower side portions. At least two of the side portions 138, 140, 142, 144 of the single length of material 136 can be stitched or otherwise connected to the mounting tab base 134, as indicated by the stitch/connection lines "L" in FIGS.

17-22, to define the overlying layers 68 of the mounting tab D 132. The stitched single length of material 136 and mounting tab base 134 form the pocket 70. The pocket 70 of the mounting tab D 132 has at least one open end portion 80 for receiving the bracket 58.

Figure 17:
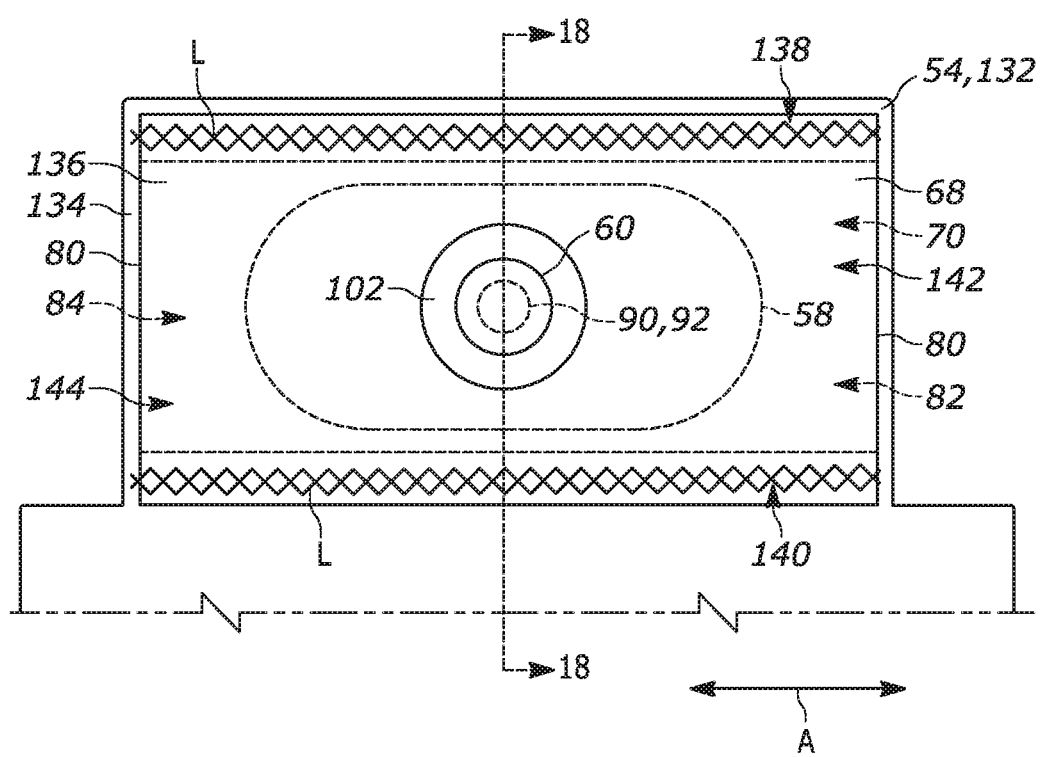
FIG. 17 is a side view of an element of the apparatus of FIG. 1, including another configuration for a portion of the apparatus.
Figure 18:
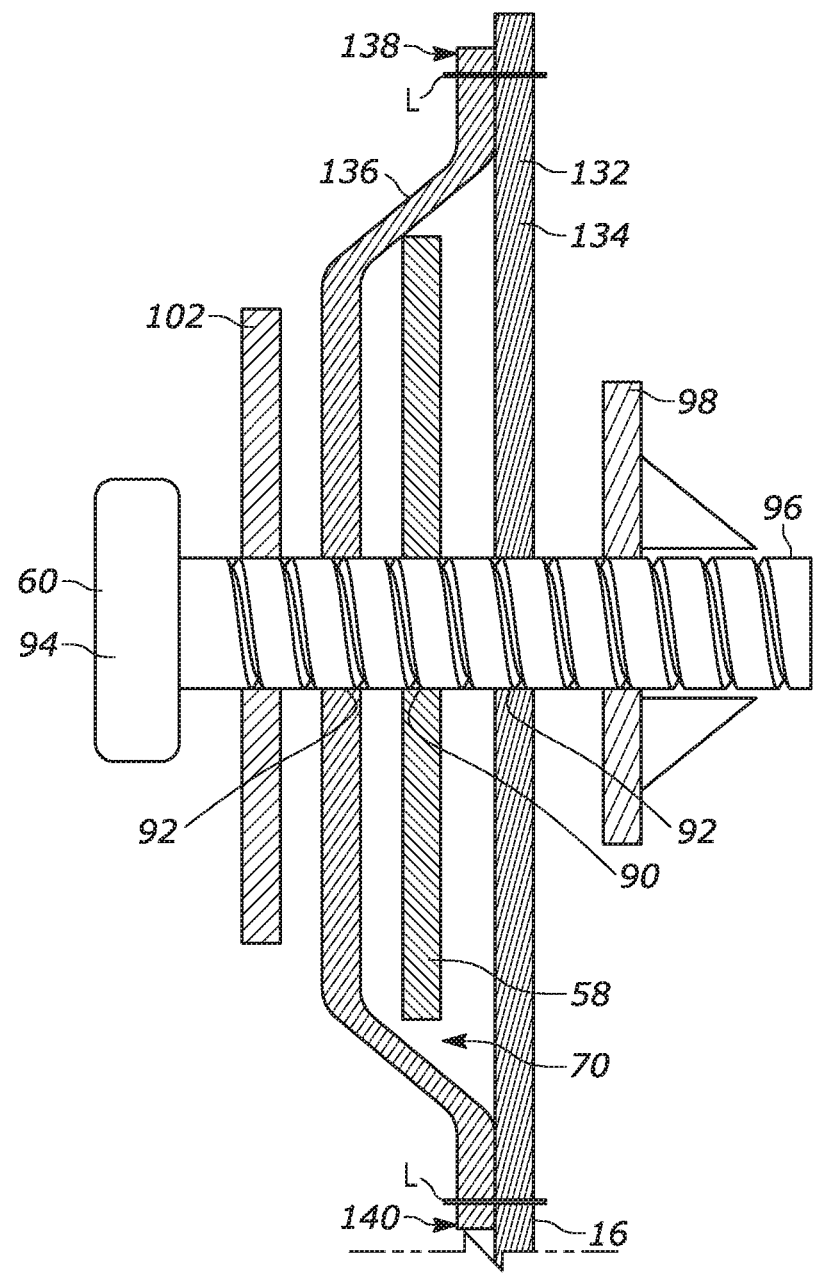
FIG. 18 is a sectional view of a portion of the apparatus of FIG. 17.

As shown in FIGS. 17-18, the upper and the lower side portions 138, 140 of the single length of material 136 are each stitched to the mounting tab base 134 to form the pocket 70. In this example configuration, the pocket 70 of the mounting tab D 132 is defined by the mounting tab base 134, the single length of material 136, and the stitched upper and lower side portions 138, 140 of the single length of material. Because only the upper and the lower side portions 138, 140 of the single length of material 136 are connected to the mounting tab base 134, the pocket 70 extends in the vehicle fore-aft direction A. The pocket 70 has an open end portion 80, which faces in the vehicle fore-aft direction A, at each of the fore and the aft side portions 82, 84 of the pocket.

Figure 19:
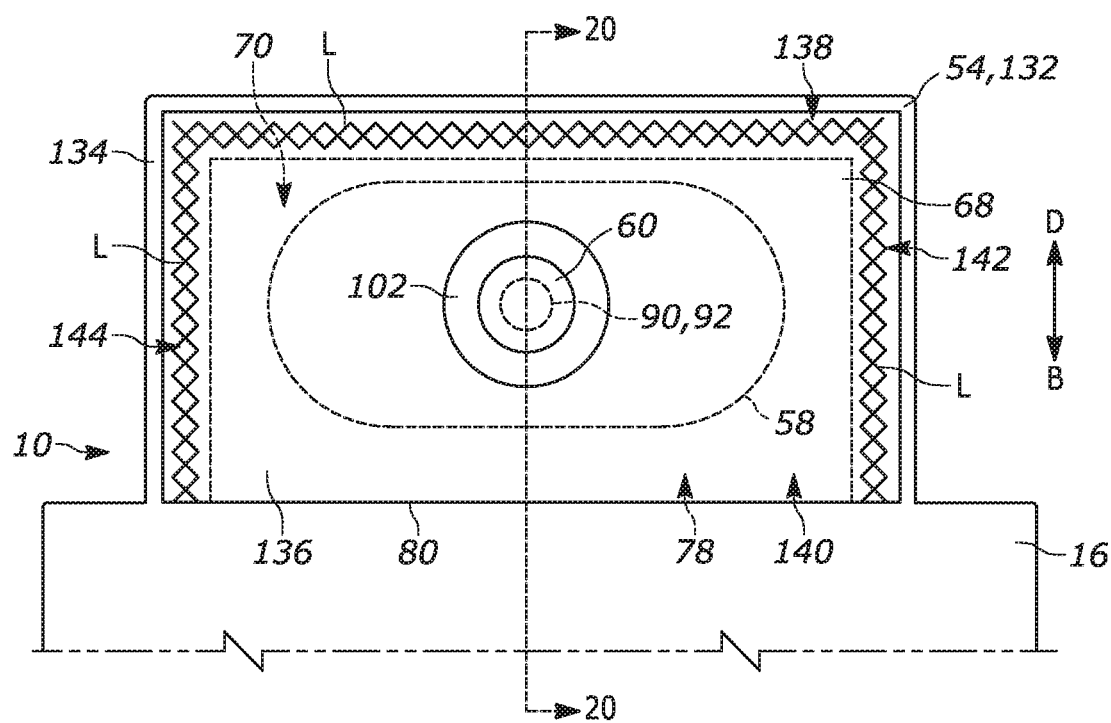
FIG. 19 is a side view of an element of the apparatus of FIG. 1, including another configuration for a portion of the apparatus.
Figure 20:
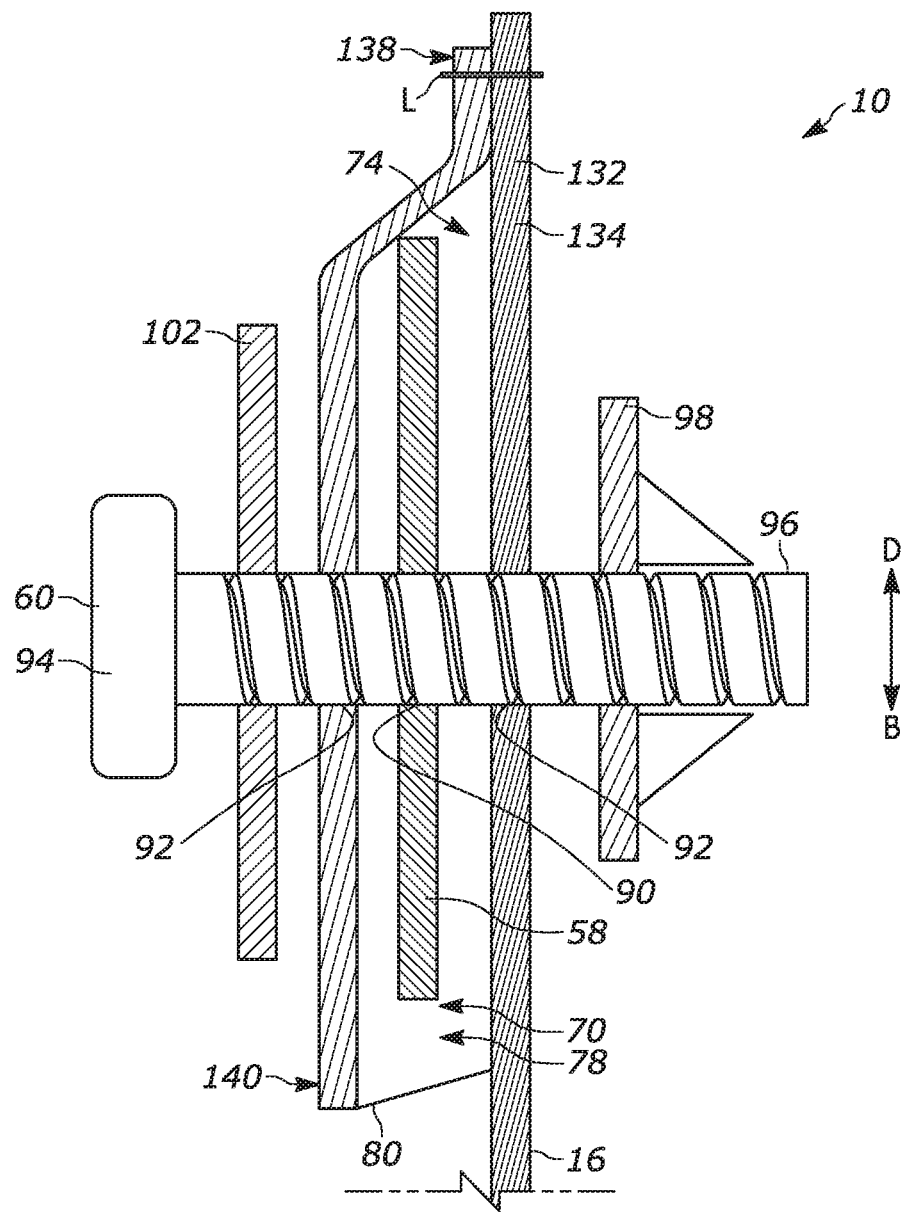
FIG. 20 is a sectional view of a portion of the apparatus of FIG. 19.

As shown in FIGS. 19-20, the upper, the fore, and the aft side portions 138, 142, 144 of the single length of material 136 are stitched to the mounting tab base 134 to form the pocket 70. In this configuration, the pocket 70 of the mounting tab D 132 is defined by the mounting tab base 134, the single length of material 136, the stitched upper, fore, and aft side portions 138, 142, 144 of the single length of material. The pocket 70 includes one open end portion 80 at the lower side portion 78 of the pocket that faces in the downward direction B. This allows the bracket 58 to be inserted in the upward direction D into the pocket 70 through the open end portion 80 at the lower side portion 78 of the pocket.

Figure 21:
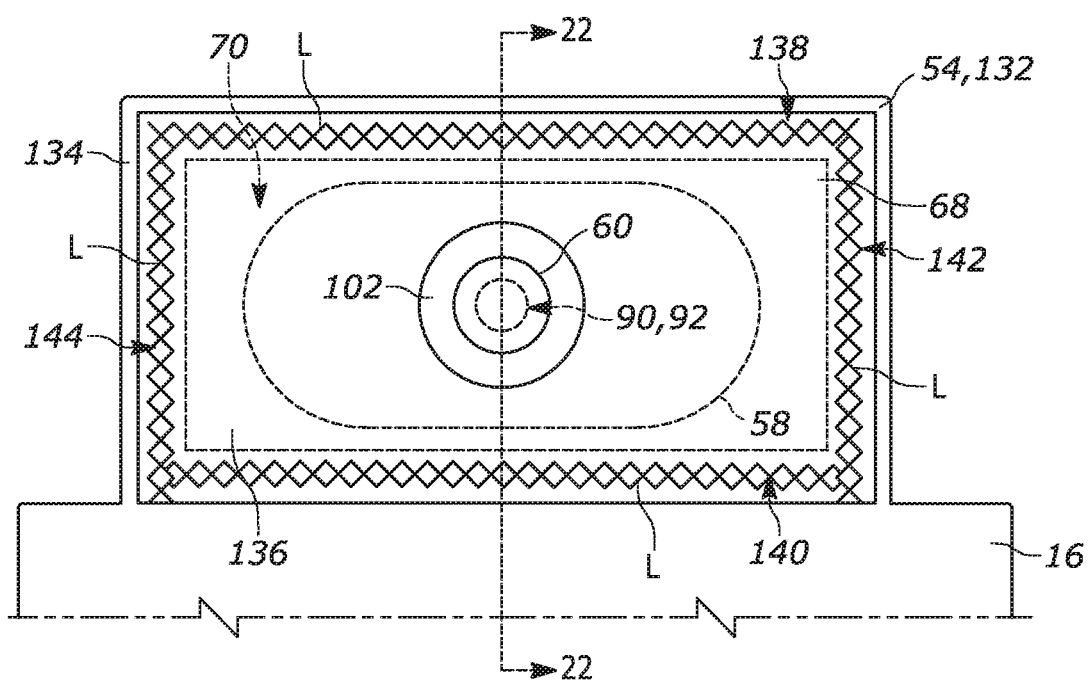
FIG. 21 is a side view of an element of the apparatus of FIG. 1, including another configuration for a portion of the apparatus.
Figure 22:
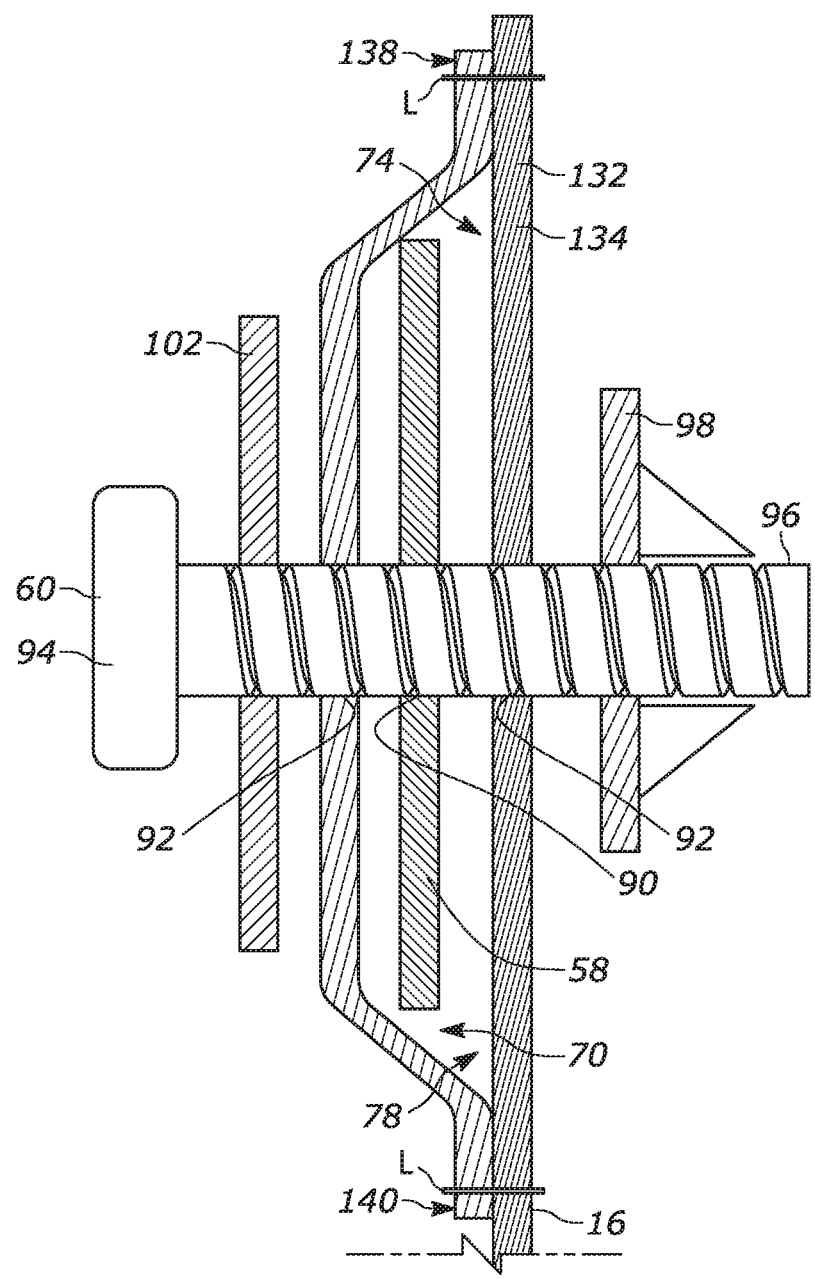
FIG. 22 is a sectional view of a portion of the apparatus of FIG. 21.

Regardless of the location or number of open end portions 80 of the pocket 70 of the mounting tab D 132, once the bracket 58 has been inserted into the pocket through an open end portion, each open end portion of the pocket may be closed by connecting the corresponding side portion 138, 140, 142, 144 of the single length of material 136 to the mounting tab base 134. This closed pocket 70 configuration, which is depicted in FIGS. 21-22, retains the bracket 58 in the pocket prior to, and after, the insertion of the fastener 60 into the mounting tab and bracket apertures 92, 90. The closed pocket 70 allows the curtain airbag 16 with the bracket 58 enclosed in the pocket to be shipped or stored prior to use with or without the fastener 60 in place.

Forming the mounting tab D 132 from a separate length of material 136 can provide the benefit of having a cost effective use of airbag material. For example, the curtain airbag 16 can be cut from a nest. In certain cases, a portion of the nest may be leftover as scrap after the curtain airbag 16 having the mounting tab base 134 is cut and formed. The length of material 136 can be cut from any scrap airbag fabric, which is not used in the formation of the curtain airbag 16 having the mounting tab base 134, and then utilized to form the pocket 70 of the mounting tab D 132. Thus, in certain cases, by utilizing scrap portions of the nest to form the separate length of material 136 utilized in the mounting tab D 132, the nest can be utilized more efficiently.

FIGS. 23-29 depict an example configuration for the mounting tabs 54, referred to as a mounting tab E 146. The curtain airbag 16 has a OPW construction and the mounting tab E 146 is formed with, i.e., at the same time as, an OPW curtain airbag 16. The mounting tab E 146 thus comprises integral woven portions of the OPW curtain airbag 16. The OPW curtain airbag 16 has two fabric layers 148, 150 that comprise integral woven portions of the OPW curtain airbag 16. The two fabric layers 148, 150 are woven simultaneously and interwoven in portions to form OPW seams 152 that define the mounting tab E 146 and at least one inflatable chamber 154 of the inflatable volume 44 of the OPW curtain airbag 16. At the mounting tab E 146, the two fabric layers 148, 150 overlie one another to form the overlying layers 68 of the mounting tab E. The overlying fabric layers 148, 150 are interconnected by the OPW seams 152 along at least two side portions to define the pocket 70 of the mounting tab E 146. Thus, at least two side portions 74, 78, 82, 84 of the pocket 70 can be bounded by the OPW seams 152. The pocket 70 of the mounting tab E 146 has at least one open end portion 80 for receiving the bracket 58. The fabric density at the OPW seams 152 can be greater than the fabric density of the separate fabric layers 148, 150 because the separate fabric layers are interwoven with one another into one layer at the OPW seams. This increase in fabric density at the OPW seams 152 can help reinforce the pocket 70 by bounding and defining the pocket with high fabric density OPW seams.

Figure 23:
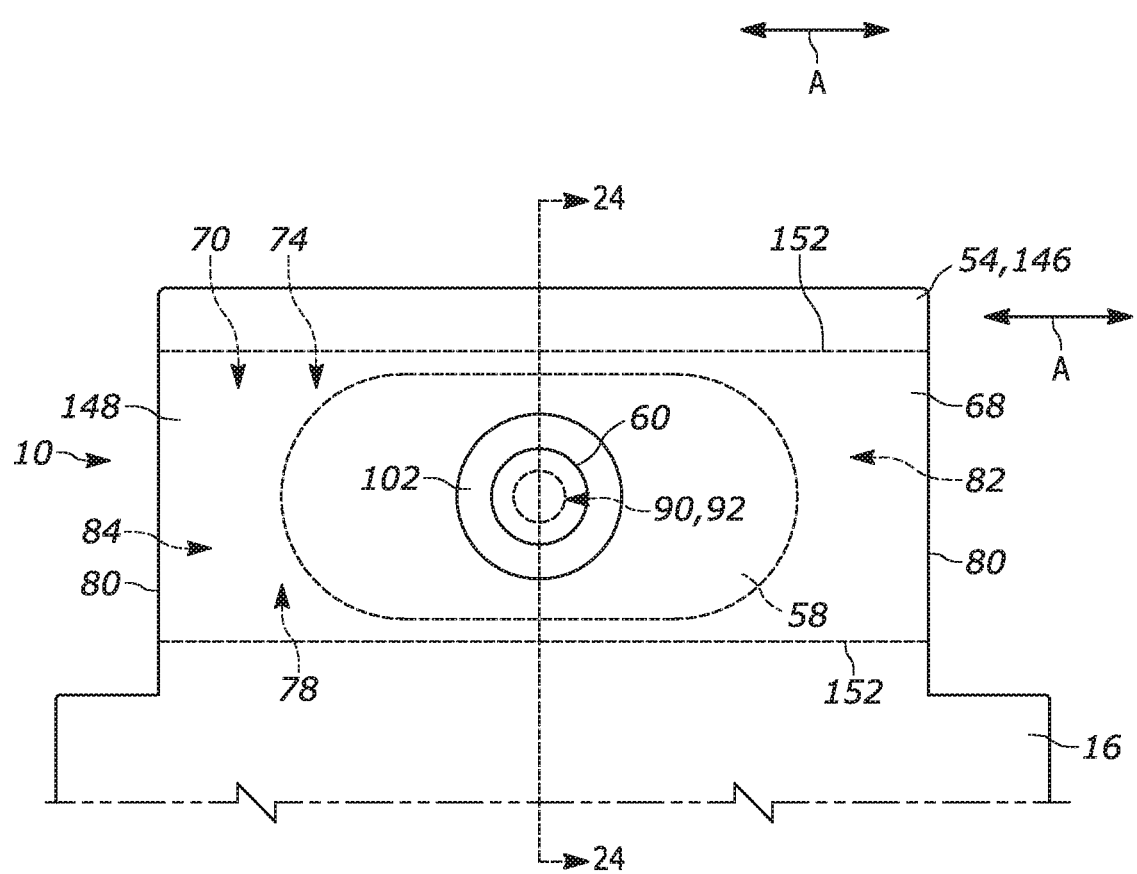
FIG. 23 is a side view of an element of the apparatus of FIG. 1, including another configuration for a portion of the apparatus.
Figure 24:
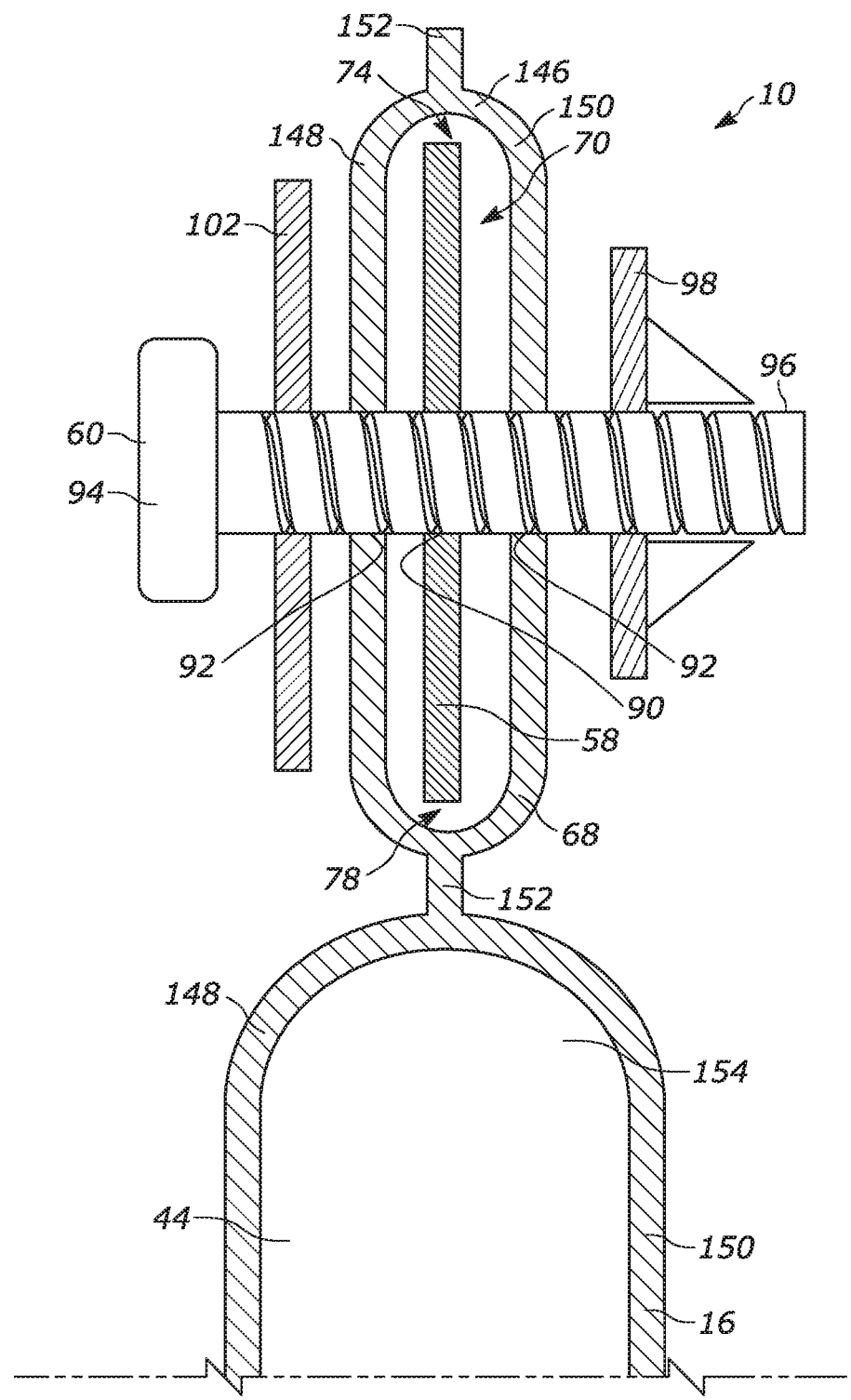
FIG. 24 is a sectional view of a portion of the apparatus of FIG. 23.

As shown in FIGS. 23-24, the upper and the lower side portions 74, 78 of the pocket 70 are each bounded by the OPW seams 152. In this example configuration, the pocket 70 of the mounting tab E 146 is defined by the overlying fabric layers 148, 150 and the OPW seams 152 bounding the upper and the lower side portions 74, 78 of the pocket. Because only the upper and the lower side portions 74, 78 of the pocket 70 are bounded by the OPW seams 152, the pocket extends in the vehicle fore-aft direction A. The pocket 70 has an open end portion 80 that faces in the vehicle fore-aft direction A at each of the fore and the aft side portions 82, 84 of the pocket.

Figure 25:
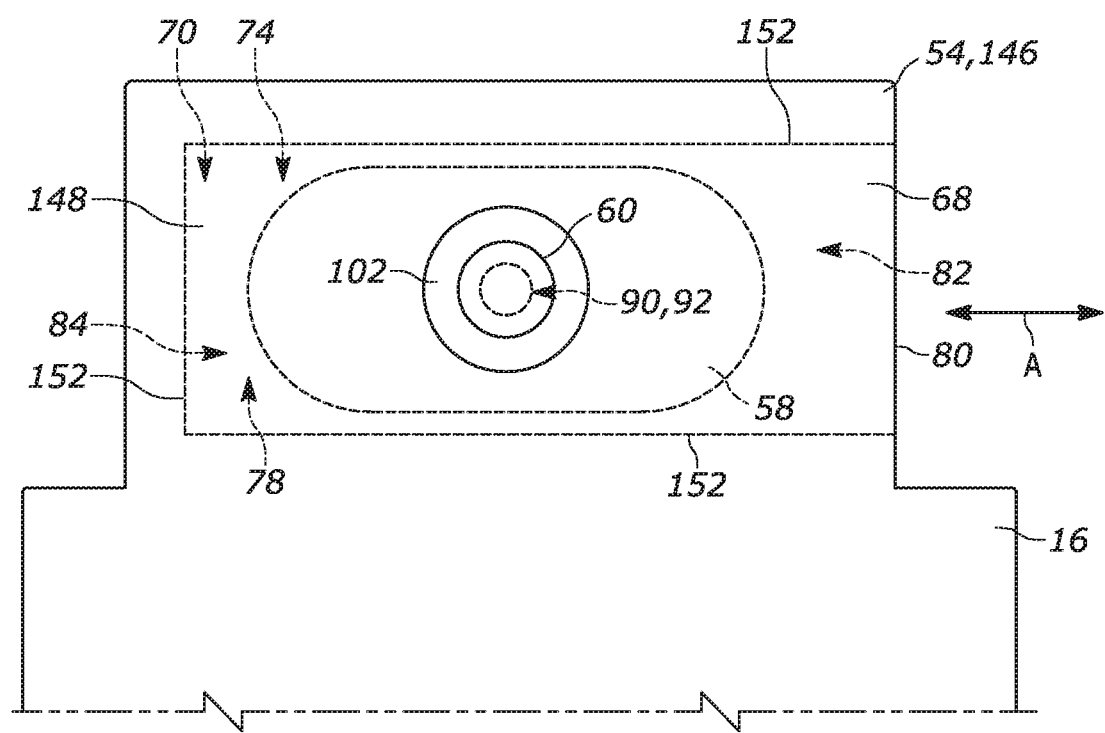
FIG. 25 is a side view of an element of the apparatus of FIG. 1, including another configuration for a portion of the apparatus.

As shown in FIG. 25, the upper, the lower, and the aft side portions 74, 78, 84 of the pocket 70 of the mounting tab E 146 are each bounded by the OPW seams 152 to form the pocket. In this example configuration, the pocket 70 of the mounting tab E 146 is defined by the overlying two fabric layers 148, 150 and the OPW seams 152 bounding the upper, the lower, and the aft side portions 74, 78, 84 of the pocket. The pocket includes one open end portion 80 at the fore side portion of the pocket that faces in the vehicle fore-aft direction A.

Figure 26:
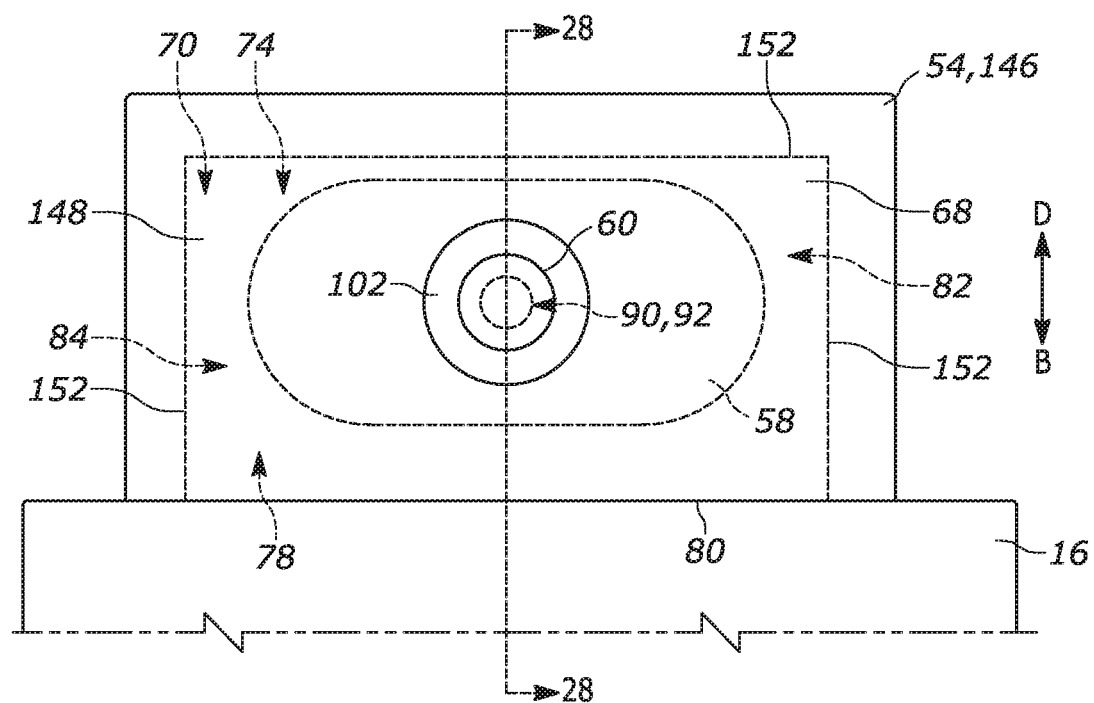
FIG. 26 is a side view of an element of the apparatus of FIG. 1, including another configuration for a portion of the apparatus.
Figure 27:
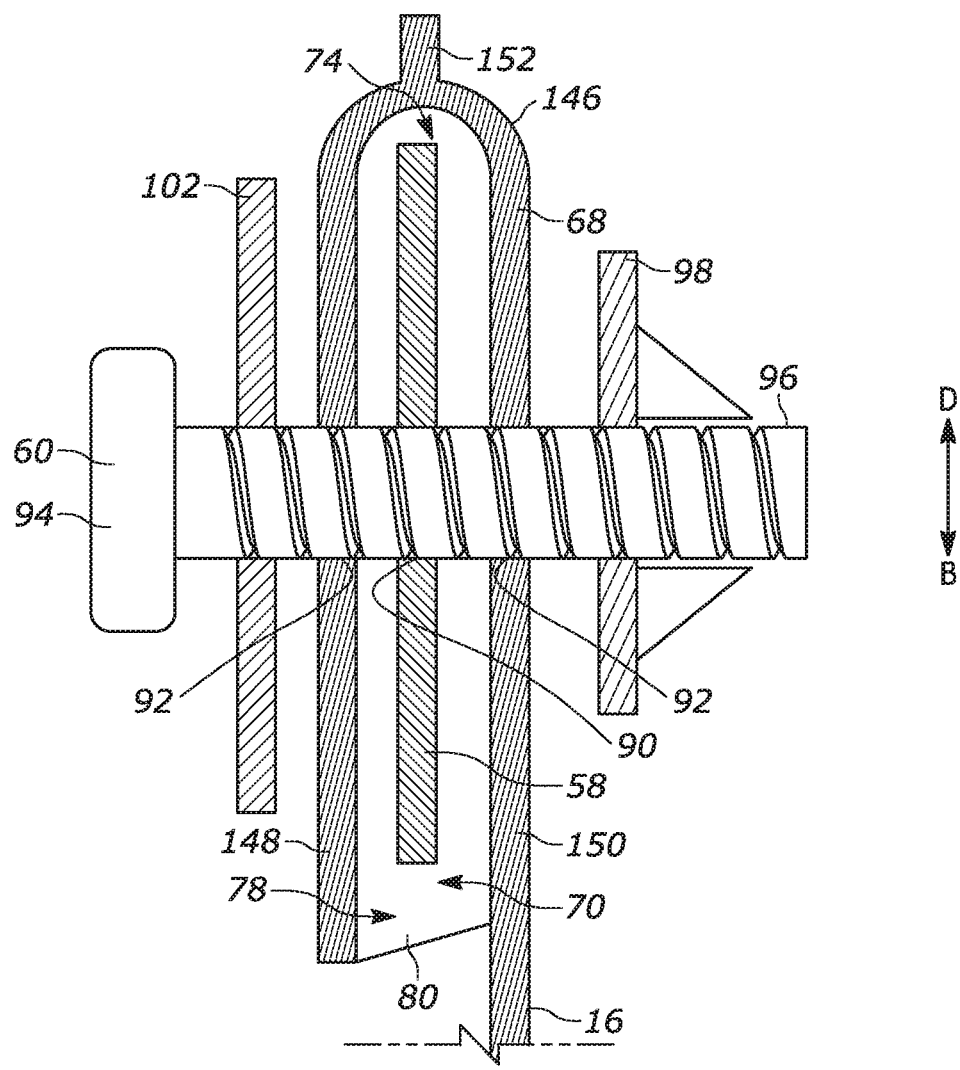
FIG. 27 is a sectional view of a portion of the apparatus of FIG. 26.

As shown in FIGS. 26-27, the upper, the fore, and the aft side portions 74, 82, 84 of the pocket 70 of the mounting tab E 146 are each bounded by the OPW seams 152 to form the pocket. In this configuration, the pocket 70 is defined by the overlying two fabric layers 148, 150 and the OPW seams 152 bounding the upper, the fore, and the aft side portions 74, 82, 84 of the pocket. The pocket includes one open end portion 80, which faces in the downward direction B, at the lower side portion of the pocket.

Figure 28:
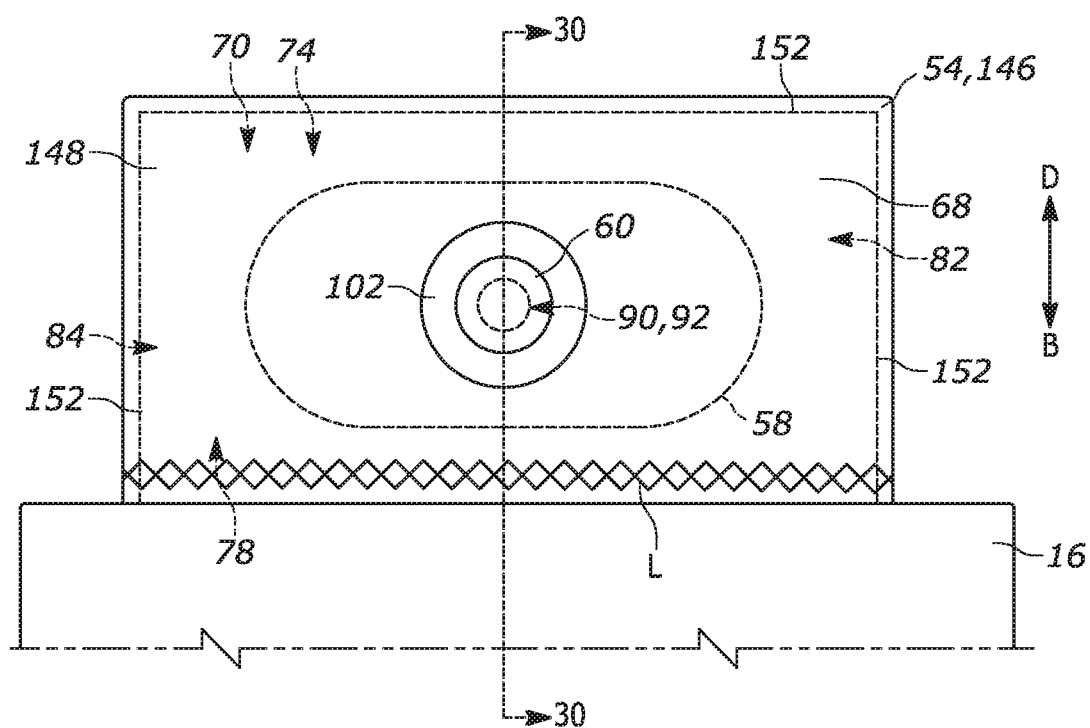
FIG. 28 is a side view of an element of the apparatus of FIG. 1, including another configuration for a portion of the apparatus.
Figure 29:
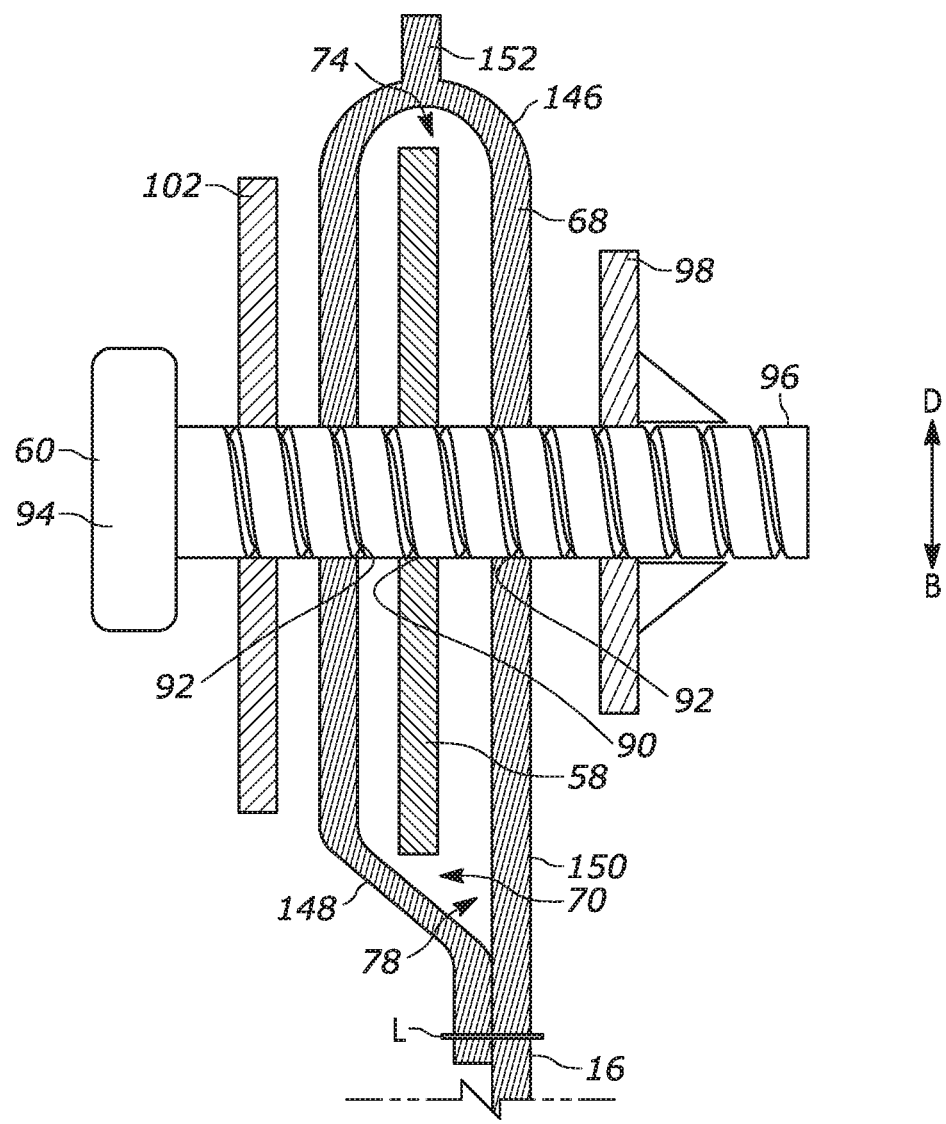
FIG. 29 is a sectional view of a portion of the apparatus of FIG. 28.

Regardless of the location or number of open end portions 80 of the pocket 70 of the mounting tab E 146, once the bracket 58 has been inserted into the pocket through an open end portion, each open end portion of the pocket may be closed by stitching or otherwise connecting, as indicated by the stitch/connection lines "L" in FIGS. 28-29, the two fabric layers 148, 150 together at the open end portion of the pocket. This closed pocket 70 configuration, which is depicted in FIGS. 28-29, retains the bracket 58 in the pocket prior to, and after, the insertion of the fastener 60 into the mounting tab and bracket apertures 92, 90. The closed pocket 70 allows the curtain airbag 16 with the bracket 58 enclosed in the pocket to be shipped or stored prior to use without the fastener 60 in place.

Forming the pocket 70 of the mounting tab E 146 with, i.e., at the same time as, an OPW curtain airbag 16 so that the mounting tab E comprises integral woven portions of the OPW curtain airbag, provides several benefits. Because the pocket 70 is formed at the same time as the OPW curtain airbag 16, no separate operation for stitching or otherwise connecting fabric is required to form the pocket. This allows for fewer labor and capital resources as separate labors and machines used to form the pocket 70 of the mounting tab E 146 are not required. Further, the formation of the pocket 70 at the same time as the OPW curtain airbag 16 saves time in assembling the mounting tab E 146 with the bracket 58. Because the pocket 70 is already formed, the bracket 58 can easily be inserted into the pocket without any additional steps. Additionally, the formation of the pocket 70 of the mounting tab E 146 at the same time as the OPW curtain airbag 16 allows the shape and the size of the pocket to be more easily designed to correspond to the shape and size of a desired bracket 58. Instead of the pocket 70 being formed by a laborer, the pocket can be formed by a computer programmable sewing machine that is capable of forming certain pocket shapes more efficiently and accurately than what a laborer could. This could potentially allow for certain brackets 58 to fit more tightly and appropriately in a corresponding pocket 70 than what would have been possible otherwise.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for helping to protect an occupant of a vehicle, comprising:
   a curtain airbag inflatable from a stored condition to a deployed condition in which the curtain airbag is positioned between a side structure of the vehicle and the vehicle occupant, the curtain airbag comprising a mounting tab comprising overlying layers of airbag material that define a pocket and through each of which a mounting tab aperture extends, the pocket having at least one open end portion;
   a bracket comprising a plate with a bracket aperture extending therethrough, the bracket being inserted into the pocket through the at least one open end portion and positioned in the pocket so that the bracket aperture is aligned with the mounting tab apertures; and
   a fastener having a portion extending though the mounting tab apertures and the bracket aperture, wherein the fastener blocks the bracket from removal from the pocket;
   wherein each open end portion of the pocket is closed by stitching or otherwise connecting the overlying layers together at each open end portion to enclose and retain the bracket enclosed in the pocket.

2. The apparatus recited in claim 1, wherein the curtain airbag is a one-piece woven (OPW) curtain airbag, and wherein the mounting tab comprises an integral woven portion of the OPW curtain airbag, the mounting tab comprising a portion of the OPW curtain airbag that is folded over to define the overlying layers, which are stitched or otherwise connected to form the pocket.

3. The apparatus recited in claim 2, wherein the folded over portion comprises a single layer portion of the OPW curtain airbag.

4. The apparatus recited in claim 1, wherein the curtain airbag is a one-piece woven (OPW) curtain airbag, and wherein the mounting tab comprises a mounting tab base and a single length of material stitched or otherwise connected to the mounting tab base to form the pocket, the mounting tab base comprising an integral woven portion of the OPW curtain airbag.

5. The apparatus recited in claim 4, wherein at least two side portions of the single length of material are stitched or otherwise connected to the mounting tab base to form the pocket.

6. The apparatus recited in claim 1, wherein the curtain airbag is a one-piece woven (OPW) curtain airbag, the OPW curtain airbag comprising two overlying fabric layers that are woven simultaneously and interwoven in portions to form OPW seams,
   wherein the mounting tab is an integral woven portion of the OPW curtain airbag, and
   wherein the overlying layers of airbag material are interconnected by the OPW seams along at least two side portions to define the pocket.

7. The apparatus recited in claim 1, wherein the mounting tab is formed separate from the curtain airbag and stitched or otherwise connected to the curtain airbag.

8. The apparatus recited in claim 1, further including a retainer, wherein the fastener includes a threaded fastener having a head and a shank, the shank extending though the mounting tab apertures and the bracket aperture, the retainer sliding onto the shank to retain the threaded fastener positioned extending through the mounting tab apertures and the bracket aperture and retain the bracket in the pocket.

9. The apparatus recited in claim 8, wherein the mounting tab comprises overlying layers of airbag material including a first portion folded over onto a second portion to define the pocket, and wherein a portion of the first portion is positioned between the head of the fastener and the bracket, the bracket is positioned in the pocket between the first and the second portions, and a portion of the second portion is positioned between the bracket and the retainer.

10. The apparatus recited in claim 1, wherein the bracket comprises a flat plate with semicircular end portions and rectilinear side portions that extend between the end portions.

11. The apparatus recited in claim 1, wherein the mounting tab further comprises at least one secondary aperture, and wherein the apparatus further comprises a secondary fastener extending through the secondary aperture.

12. The apparatus recited in claim 11, wherein a portion of the fastener and a portion of the secondary fastener are configured to extend into a support structure of the vehicle to mount the apparatus to the support structure.

13. The apparatus recited in claim 12, wherein the curtain airbag is a one-piece woven (OPW) curtain airbag, and wherein the mounting tab comprises an integral woven portion of the OPW curtain airbag, the mounting tab comprising a first section and a second section, the first section comprising a portion of the OPW curtain airbag that is folded over and stitched or otherwise connected to form the pocket and to form the overlying layers of airbag material through each of which the mounting tab aperture extends, the second section comprising the secondary aperture.

14. The apparatus recited in claim 1, wherein a portion of the fastener is configured to extend into a support structure of the vehicle to mount the apparatus to the support structure.

15. The apparatus recited in claim 14, wherein the support structure is a roof rail of the vehicle.

16. The apparatus recited in claim 1, wherein the curtain airbag comprises a plurality of mounting tabs spaced along a length of an upper portion of the curtain airbag, and wherein the apparatus further comprises a bracket and a fastener for each mounting tab to secure the apparatus to a support structure of the vehicle.

17. An inflatable curtain assembly, comprising:
the apparatus of claim 1; and
an inflator for inflating the curtain airbag from the stored condition to the deployed condition.

18. A vehicle safety system, comprising:
the inflatable curtain assembly of claim 17; and
an airbag controller configured to actuate the inflator in response to sensing the occurrence of an event for which occupant protection is desired.

19. An apparatus for helping to protect an occupant of a vehicle, comprising:
a one-piece woven (OPW) curtain airbag inflatable from a stored condition to a deployed condition in which the OPW curtain airbag is deployed between a side structure of the vehicle and the vehicle occupant, the OPW curtain airbag comprising two fabric layers that are interwoven in portions to define at least one inflatable chamber and a mounting tab comprising a pocket, the mounting tab comprising the two fabric layers overlying one another that, together with the interwoven portions, define the pocket, each of the two fabric layers at the mounting tab having a mounting tab aperture extending therethrough, the pocket having at least one open end portion;
a bracket comprising a plate with a bracket aperture extending therethrough, the bracket being inserted into the pocket through the at least one open end portion and positioned in the pocket so that the bracket aperture is aligned with the mounting tab apertures; and
a fastener having a portion extending though the mounting tab apertures and the bracket aperture, wherein the fastener blocks the bracket from removal from the pocket;
wherein each open end portion of the pocket is closed by stitching or otherwise connecting the overlying layers together at each open end portion to enclose and retain the bracket enclosed in the pocket.

20. An apparatus for helping to protect an occupant of a vehicle, comprising:
a one-piece woven (OPW) curtain airbag inflatable from a stored condition to a deployed condition in which the OPW curtain airbag is positioned between a side structure of the vehicle and the vehicle occupant, the OPW curtain airbag comprising a mounting tab comprising a portion of the OPW curtain airbag that is folded over to define overlying layers of airbag material, which are stitched or otherwise connected to form a pocket, each of the overlying layers having a mounting tab aperture extending therethrough, the mounting tab comprising at least one secondary aperture;
a bracket comprising a plate with a bracket aperture extending therethrough, the bracket being positioned in the pocket so that the bracket aperture is aligned with the mounting tab apertures;
a fastener having a portion extending though the mounting tab apertures and the bracket aperture, the fastener blocking the bracket from removal from the pocket, a portion of the fastener being configured to extend into a support structure of the vehicle to mount the apparatus to the support structure; and
a secondary fastener having a portion extending through the secondary aperture, a portion of the secondary fastener being configured to extend into the support structure to mount the apparatus to the support structure.

21. The apparatus recited in claim 20, wherein the folded over portion of the OPW curtain airbag comprises a single layer portion of the OPW curtain airbag.

22. The apparatus recited in claim 20, wherein the mounting tab comprises a first section and a second section, the first section comprising the portion of the OPW curtain airbag that is folded over and stitched or otherwise connected to form the pocket and to form the overlying layers of airbag material through each of which the mounting tab aperture extends, the second section comprising the secondary aperture.

23. An inflatable curtain assembly, comprising:
the apparatus of claim 20; and
an inflator for inflating the curtain airbag from the stored condition to the deployed condition.

24. A vehicle safety system, comprising:
the inflatable curtain assembly of claim 23; and
an airbag controller configured to actuate the inflator in response to sensing the occurrence of an event for which occupant protection is desired.

* * * * *